United States Patent [19]
Tomioka et al.

[11] Patent Number: 6,014,679
[45] Date of Patent: Jan. 11, 2000

[54] ITEM SELECTING APPARATUS IN A SYSTEM FOR BROWSING ITEMS FOR INFORMATION

[75] Inventors: Yutaka Tomioka; Fumiyuki Kato, both of Yokohama; Kazumi Harada, Tokyo; Osamu Araki, Kawasaki, all of Japan

[73] Assignee: Matsushita Electric Industrial Co., Ltd., Osaka, Japan

[21] Appl. No.: 08/758,402

[22] Filed: Nov. 29, 1996

[30] Foreign Application Priority Data

Dec. 1, 1995 [JP] Japan ..................................... 7-314135

[51] Int. Cl.[7] .................................................. G06T 11/60
[52] U.S. Cl. ........................... 707/501; 707/104; 345/302
[58] Field of Search .................................... 707/501, 502, 707/503, 513, 516, 517, 104; 345/302, 357, 115, 123, 335, 162

[56] References Cited

U.S. PATENT DOCUMENTS 5,333,247 7/1994 Gest et al. ............................... 395/138

FOREIGN PATENT DOCUMENTS 5018132 3/1993 Japan .
7-121427 5/1995 Japan .

OTHER PUBLICATIONS

Microsoft Corporation, Microsoft Excel Reference, p. 577, 1987.
"Selecting Nodes in a Hierarchial Graph Using the Keyboard" IBM Technical Disclosure Bulletin, vol. 37, No. 7, Ju. 1, 1994, pp. 151–156, XP000455469.
Simpson A: "Navagation in Hypertext: Design Issues", 13th Int. Online Information Meeting, Dec. 12, 1989, London, GB, pp. 241–255, XP000351950.
"Hypertext Control for Graphic User Interface Application Enabler Products" IMB Technical Disclosure Bulletin, vol. 38, No. 7, Jul. 1, 1995, pp. 27–29, XP000521593.

Primary Examiner—Stephen S. Hong
Assistant Examiner—Cong-Lac Huynh
Attorney, Agent, or Firm—Lowe Hauptman Gopstein Gilman & Berner

[57] ABSTRACT

When various pieces of information relating to a particular page are received, pieces of link information (or items) respectively indicating a link relationship between the particular page and a reference page are extracted from the pieces of information, a positional relationship among the items is managed in a link managing unit, and a two-dimensional map indicating a relative positional relationship between each pair of items is prepared according to the positional relationship among the items in a two-dimensional map preparing unit. Also, an image of the pieces of information is prepared in an image preparing unit, and the image in which the items are included is displayed on an image displaying unit. Thereafter, when a user input an instruction indicating a change of a remarked item, a particular item placed on an upper, lower, right or left side of the remarked item is automatically specified according to the two-dimensional map and is selected. Therefore, a desired item can be easily selected without strictly specifying a position of the desired item.

12 Claims, 33 Drawing Sheets

| ITEMS | UNIFORM RESOURCE LOCATOR INDICATING A REFERENCE PAGE IN WHICH INFORMATION IS STORED |
|---|---|
| ITEM 1 | HTTP : //WWW.MEI.CO.JP/MEI-INTRO-J.HTML |
| ITEM 2 | HTTP : //WWW.MEI.CO.JP/STATS/ |
| ITEM 3 | HTTP : //WWW.NTT.JP/SQUARE/ |
| ⋮ | ⋮ |

|         | UP      | DOWN   | RIGHT   | LEFT    |
|---------|---------|--------|---------|---------|
| TITLE 1 | TITLE 1 | ICON 2 | TITLE 1 | TITLE 1 |
| ICON 1  | TITLE 1 | WORD 1 | ICON 2  | ICON 1  |
| ICON 2  | TITLE 1 | WORD 1 | ICON 3  | ICON 1  |
| ICON 3  | TITLE 1 | WORD 2 | ICON 3  | ICON 2  |
| WORD 1  | ICON 2  | WORD 3 | WORD 2  | WORD 1  |
| WORD 2  | ICON 3  | WORD 4 | WORD 2  | WORD 1  |
| WORD 3  | WORD 1  | ICON 4 | WORD 4  | WORD 3  |
| WORD 4  | WORD 2  | ICON 6 | WORD 4  | WORD 3  |
| ⋮       |         |        |         |         |

FIG. 15

|  | UP | DOWN | RIGHT | LEFT |
|---|---|---|---|---|
| TITLE 1 | TITLE 1 | ICON 2 | MENU 1 | TITLE 1 |
| ICON 1 | TITLE 1 | WORD 1 | ICON 2 | ICON 1 |
| ICON 2 | TITLE 1 | WORD 1 | ICON 3 | ICON 1 |
| ICON 3 | TITLE 1 | WORD 2 | MENU 1 | ICON 2 |
| WORD 1 | $0 \leq X < 40$ : ICON 1<br>$40 \leq X$ : ICON 2 | WORD 3 | MENU 2 | WORD 1 |
| WORD 3 | WORD 1 | ICON 4 | WORD 4 | WORD 3 |
| WORD 4 | WORD 2 | ICON 6 | MENU 3 | WORD 3 |
| ICON 4 | WORD 3 | ICON 4 | ICON 5 | ICON 4 |
| ICON 5 | WORD 4 | ICON 5 | ICON 6 | ICON 4 |
| ICON 6 | WORD 4 | ICON 6 | MENU 3 | ICON 5 |
| MENU 1 | MENU 1 | MENU 2 | MENU 1 | ICON 3 |
| MENU 2 | MENU 1 | MENU 3 | MENU 2 | WORD 1 |
| MENU 3 | MENU 2 | MENU 3 | MENU 3 | ICON 6 |

FIG. 18

|  | UP | DOWN | RIGHT | LEFT |
|---|---|---|---|---|
| WORD 1 | WORD 1 | WORD 3 | MENU 1 | WORD 1 |
| WORD 3 | WORD 1 | ICON 4 | WORD 4 | WORD 3 |
| WORD 4 | WORD 2 | ICON 6 | MENU 2 | WORD 3 |
| ICON 4 | WORD 3 | WORD 5 | ICON 5 | ICON 4 |
| ICON 5 | WORD 4 | WORD 5 | ICON 6 | ICON 4 |
| ICON 6 | WORD 4 | WORD 5 | ICON 6 | ICON 5 |
| WORD 5 | ICON 5 | WORD 5 | MENU 3 | WORD 5 |
| MENU 1 | MENU 1 | MENU 2 | MENU 1 | WORD 1 |
| MENU 2 | MENU 1 | MENU 3 | MENU 2 | WORD 4 |
| MENU 3 | MENU 2 | MENU 3 | MENU 3 | WORD 5 |

FIG. 19A
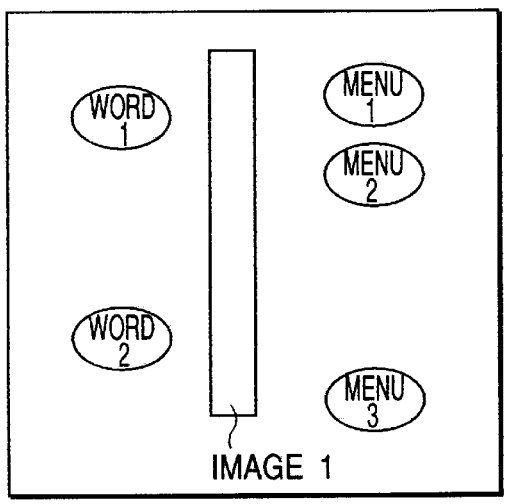
FIG. 19B
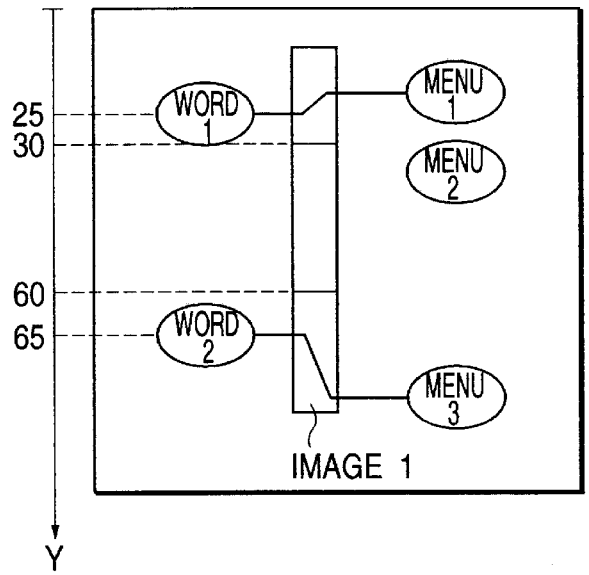
FIG. 20
| | UP | DOWN | RIGHT | LEFT |
|---|---|---|---|---|
| IMAGE 1 | | | 0≦Y<30  : MENU 1<br>30≦Y<60 : MENU 2<br>60≦Y      : MENU 3 | |
| | | | | |

FIG. 23

| | PROTOTYPE OF TWO-DIMENSIONAL MAP | | | | REVISED TWO-DIMENSIONAL MAP | | | |
|---|---|---|---|---|---|---|---|---|
| | UP | DOWN | LEFT | RIGHT | UP | DOWN | LEFT | RIGHT |
| TITLE 1 | TITLE 1 | ICON 2 | TITLE 1 | TITLE 1 | | | | MENU 1 |
| ICON 1 | TITLE 1 | WORD 1 | ICON 1 | ICON 2 | | | | |
| ICON 2 | TITLE 1 | WORD 1 | ICON 1 | ICON 3 | | | | |
| ICON 3 | TITLE 1 | WORD 2 | ICON 2 | ICON 3 | | | | MENU 1 |
| WORD 1 | ICON 2 | WORD 3 | WORD 1 | WORD 2 | | | | MENU 2 |
| WORD 2 | ICON 3 | WORD 4 | WORD 1 | WORD 2 | | | | |
| WORD 3 | WORD 1 | ICON 4 | WORD 3 | WORD 4 | | | | |
| WORD 4 | WORD 2 | ICON 6 | WORD 3 | WORD 4 | | | | MENU 3 |
| | | | | | | | | |

FIG. 24

| | PROTOTYPE OF TWO-DIMENSIONAL MAP | | | | REVISED TWO-DIMENSIONAL MAP | | | |
|---|---|---|---|---|---|---|---|---|
| | UP | DOWN | LEFT | RIGHT | UP | DOWN | LEFT | RIGHT |
| TITLE 1 | TITLE 1 | ICON 2 | TITLE 1 | TITLE 1 | | | | MENU 1 |
| ICON 1 | TITLE 1 | WORD 1 | ICON 1 | ICON 2 | | | | |
| ICON 2 | TITLE 1 | WORD 1 | ICON 1 | ICON 3 | | | | |
| ICON 3 | TITLE 1 | WORD 2 | ICON 2 | ICON 3 | | | | MENU 1 |
| WORD 1 | ICON 2 | WORD 3 | WORD 1 | WORD 2 | | | | |
| WORD 2 | ICON 3 | WORD 4 | WORD 1 | WORD 2 | | | | MENU 2 |
| WORD 3 | WORD 1 | ICON 4 | WORD 3 | WORD 4 | | | | |
| WORD 4 | WORD 2 | ICON 6 | WORD 3 | WORD 4 | | | | MENU 3 |
| | | | | | | | | |

REMARKED ITEM GROUP

FIG. 35A
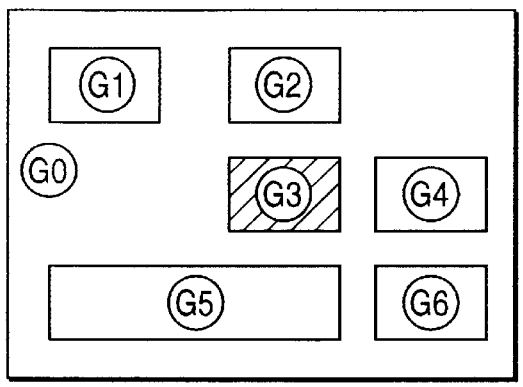
FIG. 35B
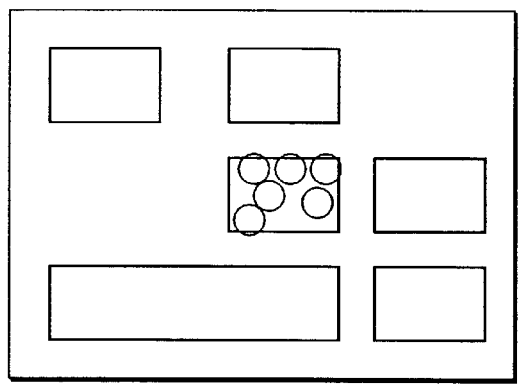
FIG. 35C
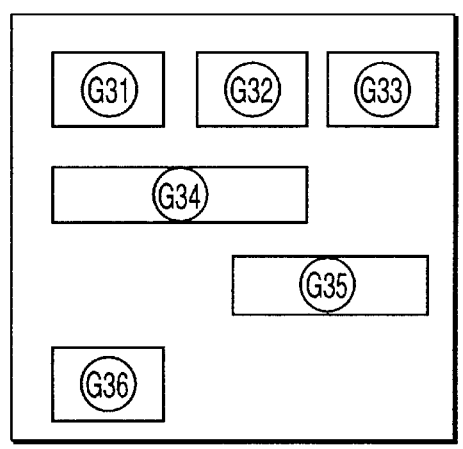
FIG. 36
| G0 | UP | DOWN | LEFT | RIGHT |
|---|---|---|---|---|
| G1 | ○ | G5 | ○ | G2 |
| G2 | ○ | G3 | G1 | ○ |
| G3 | G2 | G5 | ○ | G4 |
| G4 | ○ | G6 | G3 | ○ |
| G5 | G3 | ○ | ○ | G6 |
| G6 | G4 | ○ | G5 | ○ |

FIG. 37

| | UP | DOWN | LEFT | RIGHT |
|---|---|---|---|---|
| G1 | ○ | G5 | ○ | G2 |
| G2 | ○ | G3 | G1 | ○ |
| G3 | G2 | G5 | ○ | G4 |
| G4 | ○ | G6 | G3 | ○ |
| G5 | G3 | ○ | ○ | G6 |
| G6 | G4 | ○ | G5 | ○ |

| | UP | DOWN | LEFT | RIGHT |
|---|---|---|---|---|
| G31 | ○ | G34 | ○ | G32 |
| G32 | ○ | G34 | G31 | G33 |
| G33 | ○ | G35 | G32 | ○ |
| G34 | G31 OR G32 | G36 | ○ | ○ |
| G35 | G33 | ○ | ○ | ○ |
| G36 | G34 | ○ | ○ | ○ |

| | UP | DOWN | LEFT | RIGHT |
|---|---|---|---|---|
| G1 | ○ | G5 | ○ | G2 |
| G2 | ○ | G31, G32 OR G33 | G1 | ○ |
| G31 | G2 | G34 | ○ | G32 |
| G32 | G2 | G34 | G31 | G33 |
| G33 | G2 | G35 | G32 | G4 |
| G34 | G31 OR G32 | G36 | ○ | G4 |
| G35 | G33 | G5 | ○ | G4 |
| G36 | G34 | G5 | ○ | G4 |
| G4 | ○ | G6 | G33 OR G35 | ○ |
| G5 | G36 | ○ | ○ | G6 |
| G6 | G4 | ○ | G5 | ○ |

FIG. 40

| TYPE-GROUP | EXAMPLES |
|---|---|
| TEXT TYPE | ALPHABETS AND NUMERALS<br>JIS CHINESE CHARACTERS<br>SYMBOLS<br>⋮ |
| IMAGE TYPE | GIF TYPE IMAGE<br>JPEG TYPE IMAGE |
| ⋮ | |

FIG. 41

WOODY PD : NEW RELEASE

650MB WRITABLE TYPE DISK/CD-ROM (REPRODUCTION AT 4 TIMES SPEED)

ARTICLE NAME : ------------

ARTICLE NUMBER : ------------

PRICE : ------------

SELLING DATE : ------------

MANUFACTURED NUMBERS : ------------

AV PERSONAL COMPUTER 「WOODY」 ------ 「PD」 --

------ IMAGE DATA ------

PD/CD-ROM DRIVE IS MOUNTED

4 TIMES SPEED CD-ROM DRIVE ------

| TYPE - GROUP | CONTENTS |
|---|---|
| TEXT - TYPE | WOODY PD NEW RELEASE |
| IMAGE - TYPE | (NOTHING) |
| ⋮ | |

| TYPE - GROUP | RATIO | THE NUMBER OF EXAMPLES |
|---|---|---|
| TEXT - TYPE | 60% | ............ |
| IMAGE - TYPE | 0% | 0 |
| BACKGROUND | 40% | |

| TYPE - GROUP | RATIO | THE NUMBER OF EXAMPLES |
|---|---|---|
| TEXT - TYPE | 2% | ............ |
| IMAGE - TYPE | 90% | ............ |
| BACKGROUND | 8% | |

ITEM SELECTING APPARATUS IN A SYSTEM FOR BROWSING ITEMS FOR INFORMATION

BACKGROUND OF THE INVENTION

1. Field of the Invention

The present invention relates to an item selecting apparatus for selecting a particular item indicating a piece of particular information in a browsing system in which an information memory is conversationally browsed for pieces of information.

2. Description of the Related Art

A network system has been frequently used in recent, and a case that a user browses an information memory for pieces of information has been quickly increased. In this case, an item selecting apparatus for repeatedly selecting a particular item indicating a piece of particular information from a plurality of items displayed on an image displaying unit is used to select pieces of information.

2.1. PREVIOUSLY PROPOSED ART:

A conventional item selecting apparatus shown in FIG. 1 is described.

As shown in FIG. 1, a conventional item selecting apparatus 100 is composed of an information receiving unit 101 for receiving pieces of information in a page from an external medium (or an information memory), a link managing unit 102 for detecting one or more pieces of link information respectively indicating a link relationship between the page and another page from the information received in the information receiving unit 101, an image preparing unit 103 for determining a display layout of items indicating the information received in the information receiving unit 101 and preparing an image of the items arranged according to the display layout, an image displaying unit 104 for displaying the image of the items prepared by the image preparing unit 103, and a position indicating unit 105 for indicating one of the items displayed on the image displaying unit 104 to specify a position of one item.

In the above configuration, an operation in the conventional item selecting apparatus 100 is described.

When pieces of information relating to a particular page are received in the information receiving unit 101 from an external information memory, link information indicating a link relationship between the particular page and another page is detected in the link managing unit 102 from the pieces of information, and the link information is stored and managed in the link managing unit 102. Thereafter, a display layout of items indicating the information received in the information receiving unit 101 is determined in the image preparing unit 103, and the items of the particular page are displayed on the image displaying unit 104 according to the display layout.

Thereafter, a user observes the items displayed on the image displaying unit 104. In this case, a position on the image displaying unit 104 is indicated by the position indicating unit 105. Thereafter, when the user operates the position indicating unit 105 to select a particular item while observing the position indicated by the position indicating unit 105, a particular position of the particular item selected by the user is specified by the position indicating unit 105.

In cases where information indicated by the particular item corresponds to the link information managed in the link managing unit 102, other pieces of information relating to another page linked to the particular page according to the link information are received in the information receiving unit 101 from the external information memory to again select one item indicating one of the other pieces of information. Accordingly, because a desired item can be conversationally selected, when the selection of the desired item is repeated, it is possible to browse an information memory for pieces of desired information indicated by a plurality of desired items.

2.2. PROBLEMS TO BE SOLVED BY THE INVENTION:

However, because it is required to strictly determine the position indicated by the position indicating unit 105, it is troublesome for a user to correctly select a desired item, so that there is a drawback that it is difficult to use the item selecting apparatus 100.

Also, because the items relating to one page are arranged on the image displaying unit 104 without any order, there is a drawback that it is troublesome for a user to select a desired item.

SUMMARY OF THE INVENTION

A first object of the present invention is to provide, with due consideration to the drawbacks of such a conventional item selecting apparatus, an item selecting apparatus in which a desired item is easily selected without strictly specifying a position of the desired item on an image displaying unit.

A second object of the present invention is to provide an item selecting apparatus in which a user selects a desired item with a natural operational feeling while operating the item indicating unit according to a visual impression obtained from an image displayed on an image displaying unit.

A third object of the present invention is to provide an item selecting apparatus in which a two-dimensional map of a plurality of items renewed each time an image displayed on an image displaying unit is changed is easily managed.

A fourth object of the present invention is to provide an item selecting apparatus in which a desired item is easily selected even though a large number of items are displayed on an image displaying unit.

A fifth object of the present invention is to provide an item selecting apparatus in which an item selecting change from one item to another item is easily performed.

A sixth object of the present invention is to provide an item selecting apparatus in which a desired item selecting method changes with types of items displayed on an image displaying unit.

The first and second objects are achieved by the provision of an item selecting apparatus, comprising:

information receiving means for receiving pieces of information relating to a particular page;

link managing means for extracting pieces of link information respectively indicating a link relationship between the particular page and a reference page from the pieces of information received by the information receiving means, treating the pieces of link information as a plurality of items and managing a positional relationship among the items in the particular page;

two-dimensional map preparing means for preparing a two-dimensional map indicating a relative positional relationship between each pair of items according to the positional relationship among the items managed by the link managing means;

image preparing means for determining a display layout of the pieces of information received by the information receiving means while maintaining the positional relationship among the items managed by the link managing means and preparing an image of the pieces of information, in which the items are included, according to the display layout;

image displaying means for displaying the image of the pieces of information prepared by the image preparing means;

instruction receiving means for receiving an instruction indicating a change of a remarked item of the image displayed by the image displaying means to a particular item placed on a particular side of the remarked item and receiving an instruction indicating the selection of the particular item; and item specifying and selecting means for specifying the particular item according to the two-dimensional map prepared by the two-dimensional map preparing means in cases where the instruction indicating the change of the remarked item is received by the instruction receiving means and selecting the particular item in cases where the instruction indicating the selection of the particular item is received by the instruction receiving means.

In the above configuration, when pieces of information relating to a particular page are received by the information receiving means, pieces of link information (called items) respectively indicating a link relationship between the particular page and a reference page are extracted from the pieces of information, and a positional relationship among the items in the particular page is managed by the link managing means.

Thereafter, a two-dimensional map indicating a relative positional relationship between each pair of items is prepared according to the positional relationship among the items by the two-dimensional map preparing means. Also, a display layout of the pieces of information is determined while maintaining the positional relationship among the items, and an image of the pieces of information is prepared according to the display layout by the image preparing means. The image of the pieces of information in which the items are included is displayed by the image displaying means.

Thereafter, when an instruction indicating a change of a remarked item of the image displayed by the image displaying means to a particular item placed on a particular side of the remarked item is received by the instruction receiving means, the particular item is specified according to the two-dimensional map by the item specifying and selecting means. In this case, an instruction indicating "upper", "lower", "right" or "left" is, for example, received by the instruction receiving means when the remarked item is indicated by an indicator, and the particular item placed on the upper, lower, right or left side of the remarked item is specified by the item specifying and selecting means.

Thereafter, when an instruction indicating the selection of the particular item is received by the instruction receiving means, the particular item is selected by the item specifying and selecting means.

Accordingly, because a user is not required to directly specify a position of the particular item desired to be selected but the user is required to only indicate a change of the remarked item to the particular item, the particular item is automatically specified by the item specifying and selecting means. Therefore, a desired item represented by the particular item is easily selected without strictly specifying a position of the desired item.

Also, because an instruction indicating a change of the remarked item is, for example, a directional instruction such as "upper", "lower", "right" or "left" in cases where the particular item is placed on the upper, lower, right or left side of the remarked item, the user can selects a desired item with a natural operational feeling while operating the item selecting apparatus according to a visual impression obtained from a displayed image.

The first, second and third objects are achieved by the provision of an item selecting apparatus, comprising:

information receiving means for receiving pieces of information relating to a particular page;

link managing means for extracting pieces of link information respectively indicating a link relationship between the particular page and a reference page from the pieces of information received by the information receiving means, treating the pieces of link information as a plurality of items and managing a positional relationship among the items in the particular page;

image displaying means for displaying an image of partial pieces of information, which are selected from the pieces of information received by the information receiving means, each time the image is changed by changing the partial pieces of information;

image preparing means for determining a display layout of the pieces of information received by the information receiving means while maintaining the positional relationship among the items managed by the link managing means and preparing the image of the partial pieces of information displayed by the image displaying means according to the display layout for the partial pieces of information each time the image is changed;

two-dimensional map preparing means for preparing a two-dimensional map indicating a relative positional relationship between each pair of items included in the partial pieces of information, of which the image is displayed by the image displaying means, according to the positional relationship among the items managed by the link managing means each time the image is changed;

instruction receiving means for receiving an instruction indicating a change of a remarked item of the image displayed by the image displaying means to a particular item placed on a particular side of the remarked item and receiving an instruction indicating the selection of the particular item; and item specifying and selecting means for specifying the particular item according to the two-dimensional map prepared by the two-dimensional map preparing means in cases where the instruction indicating the change of the remarked item is received by the instruction receiving means and selecting the particular item in cases where the instruction indicating the selection of the particular item is received by the instruction receiving means.

In the above configuration, when a scroll operation is performed, an image displayed by the image displaying means is changed, and a group of items existing in the image is also changed. Therefore, one two-dimensional map prepared by the two-dimensional map preparing means is automatically renewed each time the image is changed to reflect a group of items currently existing in the image.

Accordingly, the two-dimensional map corresponding to a group of items currently existing in the image can be easily managed even though the image is changed.

It is preferred that the item selecting apparatus further comprise original position managing means for specifying a first coordinate value of the original item in a lateral direction and a second coordinate value of the original item in a longitudinal direction, holding the first coordinate value of the original item in cases where the particular item placed on the upper or lower side of the original item and one or more remarked items placed between the original item and the particular item are indicated one after another by an indicator according to the instruction received by the instruction receiving means and holding the second coordinate value of the original item in cases where the particular item placed on the right or left side of the original item and one or more remarked items placed between the original item and the particular item are indicated one after another by an indicator according to the instruction received by the instruction receiving means, and > one item of which a coordinate value in the lateral direction is closest to the first coordinate value of the original item held by the original position managing means among those of a plurality of items placed on the upper or lower side of the original item is specified as one remarked item or the particular item by the item specifying and selecting means in cases where one instruction indicating the change of the remarked item to the particular item placed on the upper or lower side of the remarked item is received by the instruction receiving means, and
>
> one item of which a coordinate value in the longitudinal direction is closest to the second coordinate value of the original item held by the original position managing means among those of a plurality of items placed on the right or left side of the original item is specified as one remarked item or the particular item by the item specifying and selecting means in cases where one instruction indicating the change of the remarked item to the particular item placed on the right or left side of the remarked item is received by the instruction receiving means.

In the above configuration, a first (or second) coordinate value of the original item in a lateral (or longitudinal) direction is held by the original position managing means in cases where the particular item placed on the upper or lower side (or right or left side) of the original item and one or more remarked items placed between the original item and the particular item are indicated one after another by an indicator according to the instruction received by the instruction receiving means. Therefore, a plurality of items exist on the upper or lower side (or right or left side) of one remarked item, a next remarked item or the particular item can be selected from the items with a natural operational feeling while operating the item selecting apparatus according to a visual impression obtained from a displayed image, and the particular item desired by the user can be reliably specified and selected.

The first, second and third objects are also achieved by the provision of an item selecting apparatus, comprising:

> information receiving means for receiving pieces of information relating to a particular page;
>
> link managing means for extracting pieces of link information respectively indicating a link relationship between the particular page and a reference page from the pieces of information received by the information receiving means, treating the pieces of link information as a plurality of changeable items and managing a positional relationship among the changeable items in the particular page;
>
> image preparing means for determining a display layout of the pieces of information received by the information receiving means while maintaining the positional relationship among the changeable items managed by the link managing means and preparing a combined image composed of a fixed image of one or more fixed items and a changeable image of partial pieces of information, which are selected from the pieces of information received by the information receiving means, each time the changeable image is changed by changing the partial pieces of information;
>
> image displaying means for displaying the combined image prepared by the image preparing means according to the display layout for the partial pieces of information each time the changeable image is changed on condition that the changeable image is placed at a changeable region of the combined image and the fixed image is placed at a fixed region of the combined image;
>
> two-dimensional map preparing means for preparing a prototype two-dimensional map indicating a relative positional relationship between each pair of changeable items according to the positional relationship among the changeable items managed by the link managing means, preparing a changeable two-dimensional map indicating a relative positional relationship between each fixed item and one changeable item adjacent to the corresponding changeable item and revising the changeable two-dimensional map each time the changeable image is changed;
>
> instruction receiving means for receiving an instruction indicating a change of a remarked item of the image displayed by the image displaying means to a particular item placed on a particular side of the remarked item and receiving an instruction indicating the selection of the particular item; and
>
> item specifying and selecting means for specifying the particular item according to the prototype two-dimensional map and the changeable two-dimensional map prepared by the two-dimensional map preparing means in cases where the instruction indicating the change of the remarked item is received by the instruction receiving means and the particular item corresponds to one fixed item and selecting the particular item in cases where the instruction indicating the selection of the particular item is received by the instruction receiving means.

In the above configuration, a prototype two-dimensional map for the changeable items and a changeable two-dimensional map for the fixed items and the changeable items are prepared by the two-dimensional map preparing means. The prototype two-dimensional map is unchangeable even though the changeable image is changed, and the changeable two-dimensional map is revised each time the changeable image is changed, for example, because of a scroll operation. Therefore, a positional relationship between a group of the changeable items and a group of the fixed items can be correctly reflected by the changeable two-dimensional map even though the changeable image is changed. Thereafter, when an instruction indicating the change of the remarked item is received by the instruction receiving means, the particular item is specified according to the prototype two-dimensional map and the changeable two-dimensional map and is selected.

Accordingly, even though the image is changed, because it is required to revise only the changeable two-dimensional map, the prototype two-dimensional map and the changeable two-dimensional map can be easily managed.

It is preferred that the item selecting apparatus further comprise emerging item detecting means for detecting one or more new changeable items newly emerging in the changeable image of the combined image prepared by the image preparing means each time the changeable image is changed, the changeable two-dimensional map being revised by the two-dimensional map preparing means in cases where one of the new changeable items is adjacent to one fixed item.

In the above configuration, one or more new changeable items newly emerging in the changeable image of the combined image each time the changeable image is changed are detected by the emerging item detecting means. When one new changeable item is adjacent to one fixed item, the changeable two-dimensional map is revised because a positional relationship between a group of the changeable items and a group of the fixed items is changed.

Accordingly, the changeable two-dimensional map can be easily revised.

The first, second and fourth objects are achieved by the provision of an item selecting apparatus, comprising:

information receiving means for receiving pieces of information relating to a particular page;

link managing means for extracting pieces of link information respectively indicating a link relationship between the particular page and a reference page from the pieces of information received by the information receiving means, treating the pieces of link information as a plurality of items and managing a positional relationship among the items in the particular page;

item classifying means for classifying the items into a plurality of item groups hierarchically ranked to various levels in a tree structure on condition that the items are allocated to a plurality of items groups ranked to the same level for each level;

image preparing means for determining a display layout of the pieces of information received by the information receiving means while maintaining the positional relationship among the items managed by the link managing means and preparing an image of the pieces of information, in which the items are included, according to the display layout on condition that the image is composed of a plurality of sub-images arranged in the tree structure and respectively corresponding to one item group prepared by the item classifying means;

displaying means for displaying the image of the pieces of information prepared by the image preparing means;

two-dimensional map preparing means for preparing a two-dimensional group map indicating a relative positional relationship between each pair of item groups existing in the same item group for each item group prepared by the item classifying means, preparing a two-dimensional map indicating a relative positional relationship between each pair of items allocated to one item group for each of the item groups ranked to the lowest level;

instruction receiving means for receiving a series of group changing instructions respectively indicating a change of a remarked item group displayed by the image displaying means to a particular item group placed on a first particular side of the remarked item group to indicate the plurality of particular item groups ranked to different levels in the order of levels of the particular item groups, receiving a group selecting instruction indicating the selection of one particular item group finally indicated by one indication instruction, receiving an item changing instruction indicating a change of a remarked item allocated to the particular item group finally indicated by one indication instruction to a particular item placed on a second particular side of the remarked item and receiving an item selecting instruction indicating the selection of the particular item; and item specifying and selecting means for specifying one particular item group according to one corresponding two-dimensional group map prepared by the two-dimensional map preparing means each time one group changing instruction is received by the instruction receiving means, selecting the particular item group finally indicated by the group selecting instruction in cases where the selection instruction is received by the instruction receiving means, specifying the particular item according to one two-dimensional map for the particular item group finally indicated by the group selecting instruction, which is prepared by the two-dimensional map preparing means, in cases where the item changing instruction is received by the instruction receiving means and selecting the particular item in cases where the item selecting instruction is received by the instruction receiving means.

In the above configuration, the items are classified into a plurality of item groups hierarchically ranked by the item classifying means, and one two-dimensional group map indicating a relative positional relationship between each pair of item groups existing in the same item group is prepared for each item group by the two-dimensional map preparing means. Therefore, when a series of group changing instructions respectively indicating a change of a remarked item group to a particular item group is received by the instruction receiving means to indicate the particular item groups ranked to different levels in the order of levels of the particular item groups, each of the particular item groups are specified according to the two-dimensional group maps by the item specifying and selecting means in the order of levels of the particular item groups, so that one particular item group finally indicated by the group selecting instruction is specified.

Thereafter, when a change of a remarked item allocated to the selected particular item group to a particular item is received by the instruction receiving means, the particular item is specified and selected by the item specifying and selecting means.

Accordingly, even though a large number of items exist in the particular page and is displayed by the image displaying means, because the items are classified into the item groups hierarchically ranked, a desired item group in which a desired item exists can be easily selected, and the desired item can be easily selected.

The first, second and sixth objects are achieved by the provision of an item selecting apparatus, comprising:

information receiving means for receiving pieces of information relating to a particular page;

link managing means for extracting pieces of link information respectively indicating a link relationship between the particular page and a reference page from the pieces of information received by the information receiving means, treating the pieces of link information as a plurality of items and managing a positional relationship among the items in the particular page;

image preparing means for determining a display layout of the pieces of information received by the information receiving means while maintaining the positional relationship among the items managed by the link managing means and preparing an image of the pieces of information, in which the items are included, according to the display layout;

image displaying means for displaying the image of the pieces of information prepared by the image preparing means;

item type managing means for detecting types of the items extracted by the link managing means, allocating one or more items having the same type to one type-group for each of the types to allocate all of the items to a plurality of type-groups respectively corresponding to one type and managing the items having the type-groups;

item type occupying ratio calculating means for calculating a total item area occupied by one or more items, which are displayed by the image displaying means and are allocated to the same type-group by the item type managing means, for each of the type-groups and calculating a ratio of the total item area to an area of the image for each of the type-groups;

item dividing means for dividing the items displayed by the image displaying means into a plurality of bundles respectively placed at a selection possible region according to a dividing method determined by the ratios calculated by the item type occupying ratio calculating means for the type-groups;

two-dimensional map preparing means for preparing a two-dimensional bundle map indicating a positional relationship between each pair of bundles obtained by the item dividing means and preparing a two-dimensional map indicating a relative positional relationship between each pair of items in the same bundle for each bundle according to the positional relationship among the items managed by the link managing means;

instruction receiving means for receiving a series of bundle changing instructions respectively indicating a change of a remarked bundle displayed by the image displaying means to another bundle placed on a particular bundle side of the remarked bundle to indicate a particular bundle placed at a particular selection possible region, receiving a bundle selecting instruction indicating the selection of the particular bundle in cases where one bundle remarked according to one bundle changing instruction finally received agrees with the particular bundle, receiving a series of item changing instructions respectively indicating a change of a remarked item in the particular bundle displayed by the image displaying means to another item placed on a particular item side of the remarked item to indicate the particular item placed at a particular selection possible position, and receiving an item selecting instruction indicating the selection of the particular item in cases where one item remarked according to one item changing instruction finally received agrees with the particular item; and item specifying and selecting means for specifying the particular bundle according to the two-dimensional bundle map prepared by the two-dimensional map preparing means in cases where the series of bundle changing instructions is received by the instruction receiving means, selecting the particular bundle in cases where the bundle selecting instruction is received by the instruction receiving means, specifying the particular item according to the two-dimensional map prepared by the two-dimensional map preparing means in cases where the series of item changing instructions is received by the instruction receiving means and selecting the particular item in cases where the item selecting instruction is received by the instruction receiving means.

In the above configuration, one or more items having the same type are allocated to one type-group for each of the types by the item type managing means, a ratio of a total item area occupied by the items allocated to the same type-group to an area of the image is calculated for each of the type-groups by the item type occupying ratio calculating means, all items of the particular page are divided into a plurality of bundles according to a dividing method determined by the ratios by the item dividing means, and a two-dimensional bundle map indicating a positional relationship between each pair of bundles is prepared by the two-dimensional map preparing means. Thereafter, when a series of bundle changing instructions and a bundle selecting instruction are received by the instruction receiving means, a particular bundle in which a particular item desired to be selected exists is selected by the item specifying and selecting means.

Accordingly, because all items of the particular page are divided into a plurality of bundles according to a dividing method determined by the ratios, the items can be divided according to a type of a group of the items such as a text, image or a dynamic image. That is, a desired item selecting method can change with the types of the items in the particular page.

BRIEF DESCRIPTION OF THE DRAWINGS

The objects, features and advantages of the present invention will be apparent from the following description taken in conjunction with the accompanying drawings, in which:

FIG. 15 shows an example of a two-dimensional map corresponding to the image shown in FIG. 14;

FIG. 18 shows the two-dimensional map corresponding to the image shown in FIG. 17;

FIG. 19A shows another example of an image displayed on the image displaying unit;

FIG. 19B shows a change of a remarked item depending on an X coordinate;

FIG. 20 shows a part of a two-dimensional map corresponding to the change of the remarked item shown in FIG. 19B;

FIG. 23 shows a prototype of a two-dimensional map and a revised two-dimensional map;

FIG. 24 shows the prototype of the two-dimensional map and another revised two-dimensional map;

FIG. 33 shows a ten-key used for the item selecting apparatus shown in FIG. 32;

FIG. 35A shows an arrangement of a plurality of item groups displayed on an image displaying unit;

FIG. 35B shows the arrangement of the item groups in which an item group G3 is selected;

FIG. 35C shows an enlarged view of the selected item group G3 in which a plurality of item groups are included;

FIG. 36 shows a two-dimensional group map for an item group G0;

FIG. 37 shows a renewed two-dimensional group map for the selected item group G3 obtained by merging the two-dimensional group map for the item group G1 and a two-dimensional group map for the item group G3;

FIG. 40 shows criteria for classifying an item as a text type or an image type;

FIG. 41 shows a document of which pieces of information are received and displayed in the item selecting apparatus shown in FIG. 38;

DETAILED DESCRIPTION OF THE EMBODIMENTS

Preferred embodiments of an item selecting apparatus according to the present invention are described with reference to drawings.

(First Embodiment)

Figure 1:
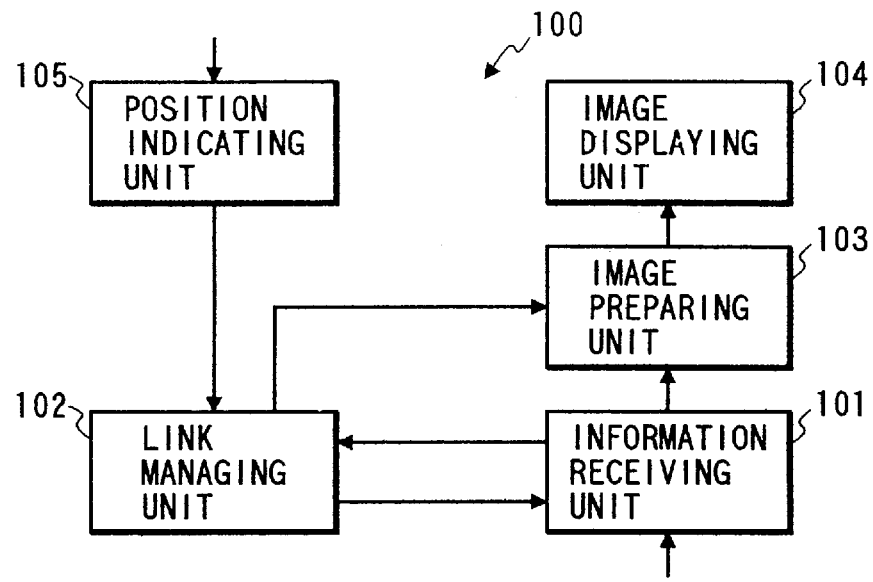
FIG. 1 is a block diagram of a conventional item selecting apparatus.
Figure 2:
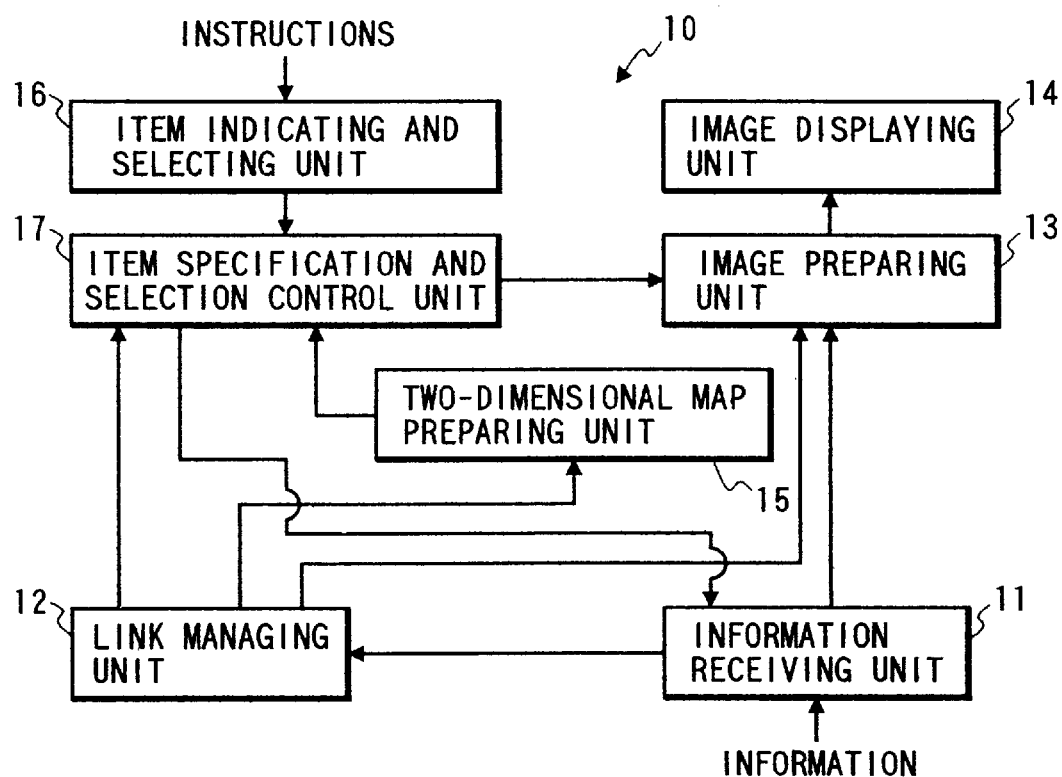
FIG. 2 is a block diagram of an item selecting apparatus according to a first embodiment of the present invention.

FIG. 2 is a block diagram of an item selecting apparatus according to a first embodiment of the present invention.

As shown in FIG. 2, an item selecting apparatus 10 comprises an information receiving unit 11 for receiving pieces of information in a particular page from an external medium (or an information memory), a link managing unit 12 for detecting one or more pieces of link information respectively indicating a link relationship between the particular page and a reference page from the information received in the information receiving unit 11, treating each of the pieces of link information as an item and managing a positional relationship among the items in the particular page, a two-dimensional map preparing unit 15 for preparing a two-dimensional map indicating a relative positional relationship between each pair of items according to the positional relationship among the items managed in the link managing unit 12, an image preparing unit 13 for determining a display layout of the pieces of information received in the information receiving unit 11 and preparing an image of the pieces of information arranged according to the display layout on condition that the items detected by the link managing unit 12 are arranged in the image according to the positional relationship among the items managed in the link managing unit 12, an image displaying unit 14 for displaying the image of the pieces of information prepared by the image preparing unit 13 on condition that the items are placed at one or more selection possible positions in the image, an item indicating and selecting unit 16 for receiving an item changing instruction indicating a change of a remarked item displayed on the image displaying unit 14 to another item placed on one (right, left, upper or lower) side of the remarked item from a user to indicate a particular item placed at a particular selection possible position by repeating the change of the remarked item and receiving an item selecting instruction indicating the selection of the particular item in cases where it is judged by the user that the particular item agrees with a desired item, and an item specification and selection control unit 17 for analyzing the item changing instruction received in the item indicating and selecting unit 16 while referring to the two-dimensional map prepared by the two-dimensional map preparing unit 15 to identify one item placed on one side of the remarked item as a new remarked item, specifying the particular item by analyzing the item changing instructions repeatedly received in the item indicating and selecting unit 16, selecting the particular item according to the item selecting instruction and instructing the information receiving unit 11 to receive pieces of information relating to one reference page indicated by the particular item.

Figure 3:
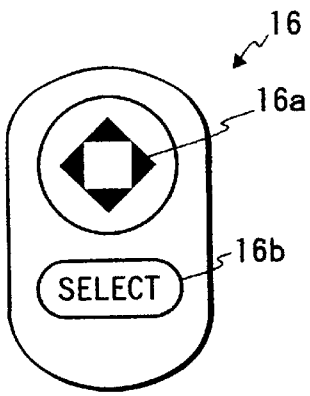
FIG. 3 shows an example of a position indicating unit shown in FIG. 2.

An example of the item indicating and selecting unit 16 is shown in FIG. 3. As shown in FIG. 3, the item indicating and selecting unit 16 has an indicated item changing switch 16a for changing a position of an indicator indicating one item placed at a first selection possible position to another item placed at a second selection possible position which is placed on an upper, lower, light or left side of the first selection possible position and a selection switch 16b for selecting one particular item placed at one particular selection possible position which is indicated by the indicator.

A detail of each piece of link information of a particular page indicating a link relationship between the particular page and a reference page is indicated in the reference page.

In the above configuration, an operation in the item selecting apparatus 10 is described.

Figure 4:
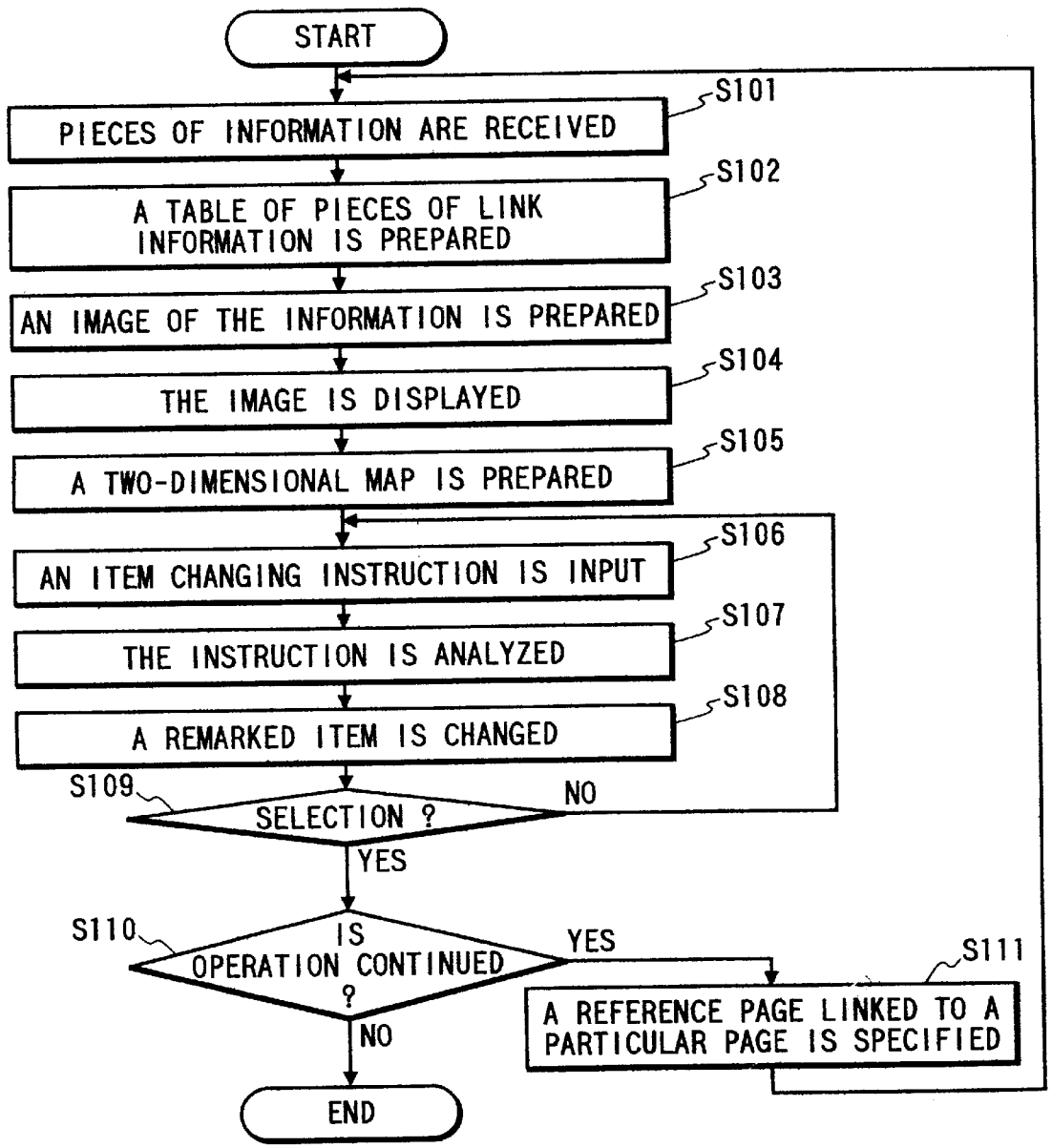
FIG. 4 shows a flow chart of an operation in the item selecting apparatus shown in FIG. 2.

FIG. 4 shows a flow chart of an operation in the item selecting apparatus 10.

As shown in FIG. 4, when pieces of information relating to a particular page are transmitted from an external medium (or an information memory) through a network system according to a predetermined protocol such as an HTTP (hyper-text transfer protocol) and are received in the information receiving unit 11 (step S101), one or more pieces of link information are extracted from the pieces of information in the link managing unit 12, and a table of the pieces of link information is prepared in the link managing unit 12 to manage a positional relationship among the items (link information) in the particular page (step S102). The information are written in a structural document form according to an HTML (hyper-text makeup language), and each of the link information indicates a link relationship between the particular page and a reference page. A table of the pieces of link information is, for example, shown in FIG. 5.

Figures 5, 6:
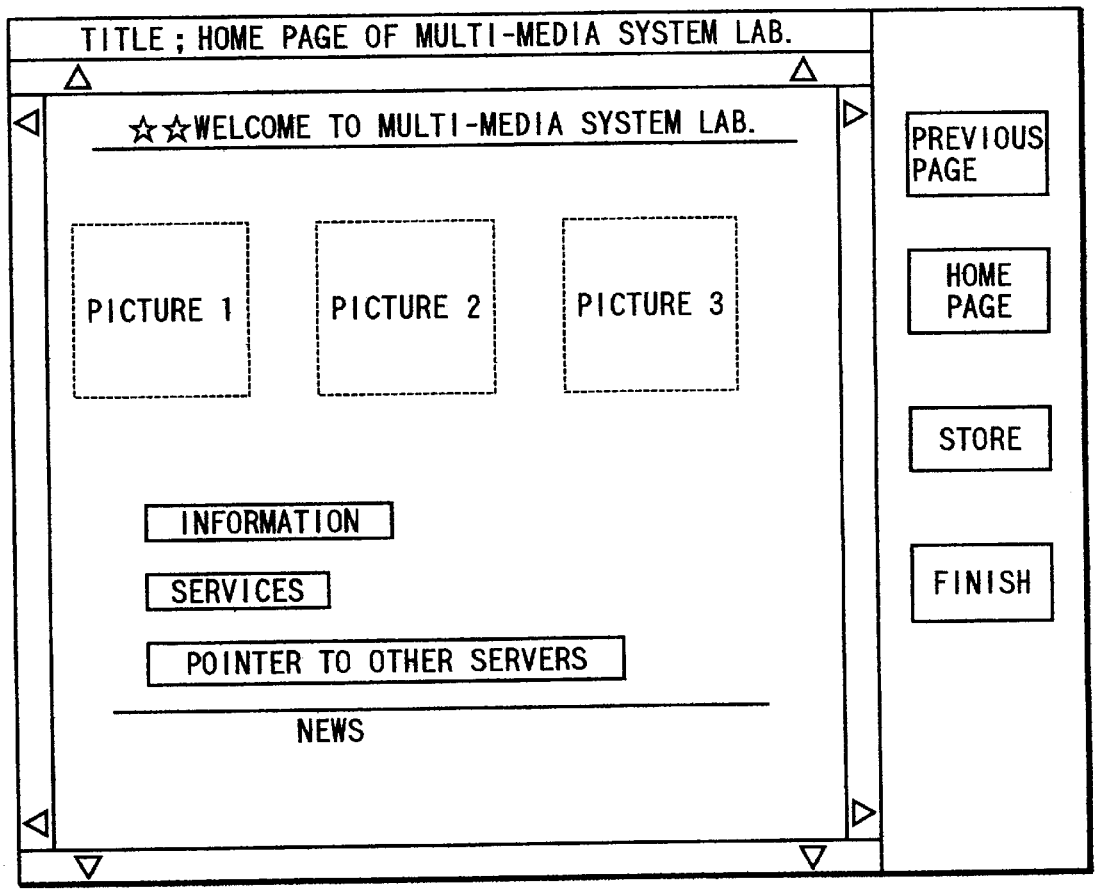
FIG. 5 shows a table of pieces of link information extracted by a link managing unit shown in FIG. 2.
FIG. 6 shows an example of pieces of information which are arranged according to a display layout and are displayed on an image displaying unit according to the first embodiment.

Thereafter, in the image preparing unit 13, a display layout of the pieces of information is determined, and an image of the pieces of information arranged according to the display layout is prepared (step S103). In this case, the items detected by the link managing unit 12 are arranged in the image according to the positional relationship among the items managed in the link managing unit 12. Thereafter, the image of the pieces of information is displayed on the image displaying unit 14 (step S104). In this case, the items are placed at one or more selection possible positions in the image. For example, an image shown in FIG. 6 is prepared in the image preparing unit 13 and is displayed on the image displaying unit 14. As shown in FIG. 6, a plurality of items ("information", "services", "pointer to other servers", "previous page", "home page", "store" and "finish") corresponding to the pieces of link information are respectively surrounded by a closed solid line formed in a push button shape and are arranged at a plurality of selection possible positions.

Figure 7:
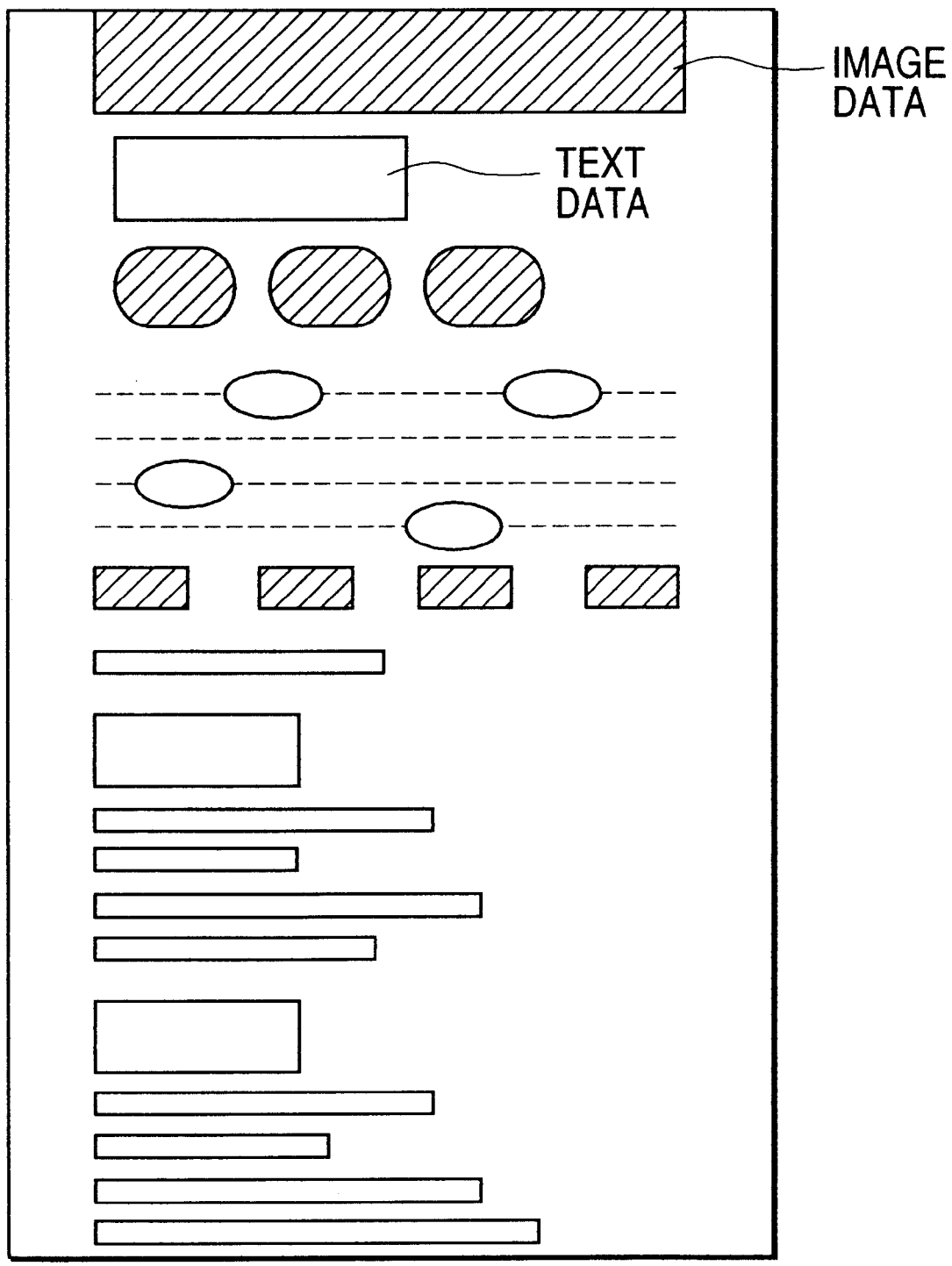
FIG. 7 shows an example of a layout of a plurality of items displayed on an image displaying unit according to the first embodiment.
Figures 8, 10:
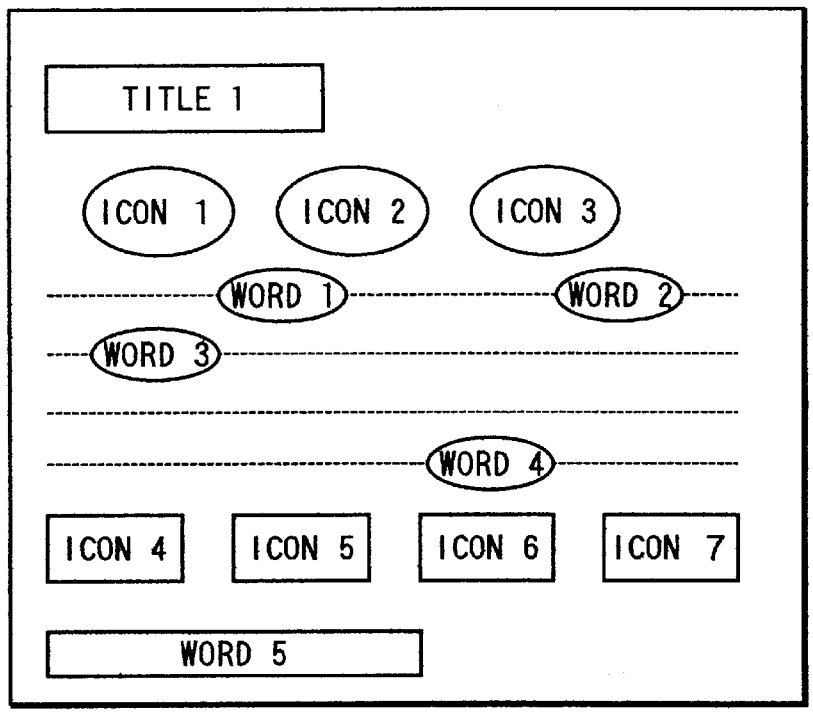
FIG. 8 shows an upper portion of the items shown in FIG. 7.
FIG. 10 shows the two-dimensional map in which a plurality of positional relationships among the items shown in FIG. 8 are indicated in a tabular form.
Figure 9:
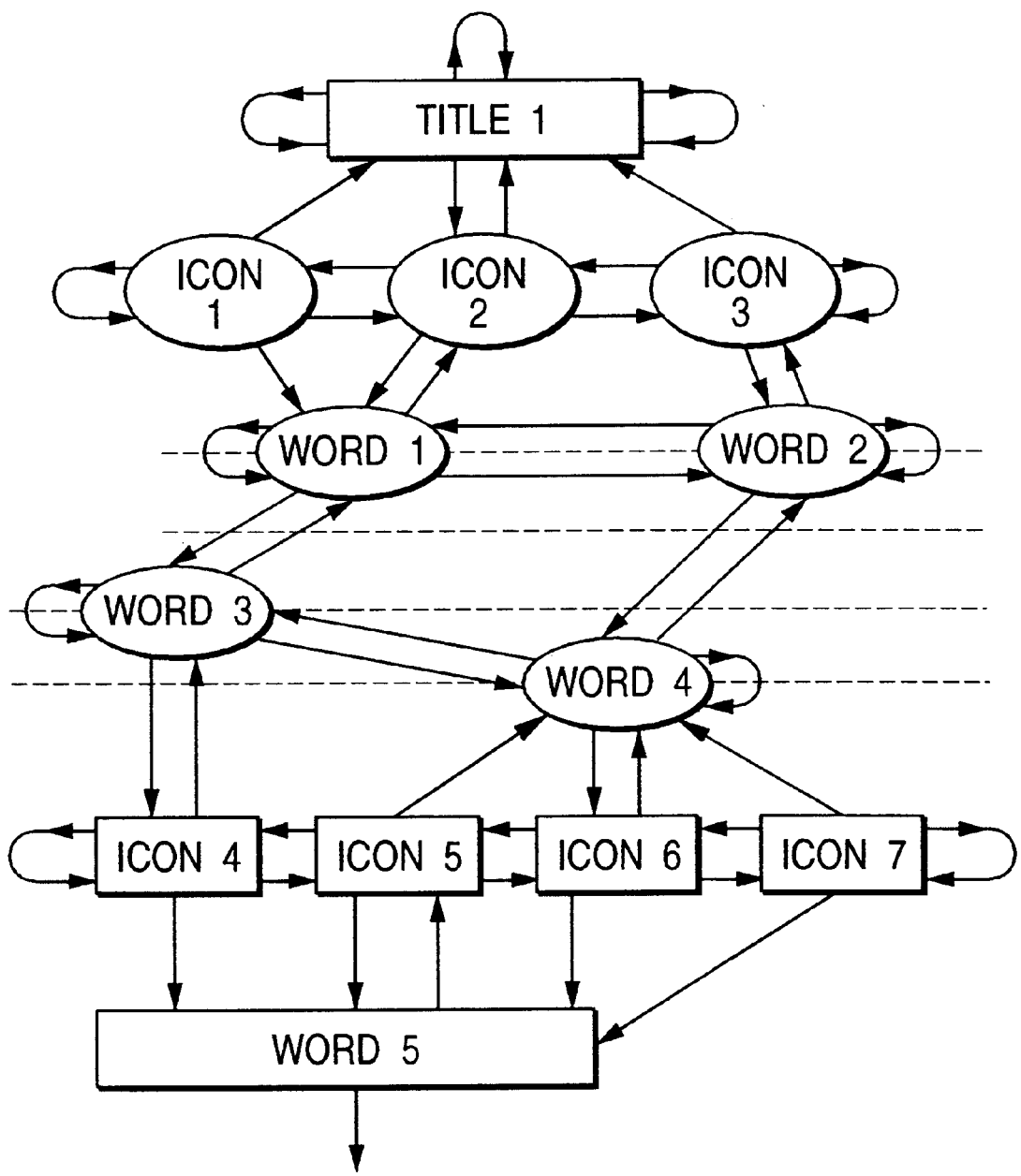
FIG. 9 visually shows positional relationships among the items shown in FIG. 8 to express a concept of a two-dimensional map.

Also, a two-dimensional map indicating a relative positional relationship between each pair of items is prepared in the two-dimensional map preparing unit 15 according to the positional relationship among the items managed in the link managing unit 12 (step S105). For example, as shown in FIG. 7, each of a plurality of items is arranged in the particular page and is surrounded by a closed solid line, so that it is explicitly indicated that each of the items is placed at one selection possible position and is possible to be selected. A plurality of items placed at a top portion of the particular page are shown in FIG. 8. Each piece of link information expressed by a piece of image data is placed at one selection possible position indicated by a hatched portion in FIG. 7, and each piece of link information expressed by a piece of text data is placed at one selection possible position indicated by a white portion in FIG. 7. In this case, a two-dimensional map for the items shown in FIG. 8 is shown in FIG. 9, and a table of a plurality of positional relationships indicated by the two-dimensional map shown in FIG. 9 is shown in FIG. 10. This table of the positional relationships among the items is prepared in the two-dimensional map preparing unit 15.

After the two-dimensional map is prepared (step S105), when an item changing instruction indicating a change of a remarked item indicated by an indicator on the image displaying unit 14 to an item placed on one side of the remarked item is input to the item indicating and selecting unit 16 by a user (step S106), the item changing instruction input to the item indicating and selecting unit 16 is analyzed by the item specification and selection control unit 17 while referring to the two-dimensional map to specify one item placed on one side of the remarked item according to one relative positional relationship between the remarked item and one item placed on one side of the remarked item indicated by the two-dimensional map (step S107), and the one item is specified by the control unit 17 and is indicated by the indicator on the image displaying unit 14 as a new remarked item (S108). Thereafter, in cases where the user judges that the remarked item newly specified does not agree with a particular item to be selected, the remarked item newly specified is not selected (step S109), and the steps S106 and S108 are repeated until the particular item is indicated by the indicator. In cases where the remarked item newly specified agrees with the particular item, the particular item is selected under the control of the item specification and selection control unit 17 (step S109).

In detail, in cases where an item "title 1" shown in FIG. 8 is, for example, currently indicated by an indicator, it is assumed that the user desires to select a particular item "word 4". In this case, the user pushes a "down" button of the indicated item changing switch 16a three times and pushes a "right" button of the indicated item changing switch 16a once, and the user pushes the selection switch 16b to select an item finally indicated by the indicator. Therefore, because it is indicated by the two-dimensional map shown in FIG. 10 that an item placed on the lower side of the item "title 1" is an item "icon 1", an item placed on the lower side of the item "icon 1" is an item "word 1", an item placed on the lower side of the item "word 1" is an item "word 3" and an item placed on the right side of the item "word 3" is an item "word 4", an item indicated by the indicator on the image displaying unit 14 is changed to the item "icon 1", the item "word 1", the item "word 3" and the particular item "word 4" in that order, and the particular item "word 4" is selected in the item selecting apparatus 10.

Also, in cases where the user desires to select an item "icon 2" when an item indicated by the indicator is the particular item "word 4", the selection of the particular item "word 4" is not performed, the user pushes an "up" button two times and pushes a "left" button once, and the user pushes the selection switch 16b to select an item finally indicated by the indicator. Therefore, an item indicated by the indicator on the image displaying unit 14 is changed to an item "word 2", an item "icon 3" and the item "icon 2" in that order, and the item "icon 2" is selected in the item selecting apparatus 10.

After the selection of the particular item (step S109), it is judged by the user whether or not the operation of the item selecting apparatus 10 is continued (step S110). In cases where the operation of the item selecting apparatus 10 is continued, a reference page linked to the particular page according to a piece of particular link information designated by the particular item is specified by the function of the link managing unit 12 (step S111), and pieces of information relating to the reference page are received in the information receiving unit 11 (step S101) under the management of the link managing unit 12. Therefore, a reference particular item of the reference page is selected in the same manner.

Accordingly, because the user is not required to strictly specifying a position of a desired item by using a mouse but required to push one or more buttons of the indicated item changing switch 16a in the item indicating and selecting unit 16, the desired item is easily selected without strictly specifying a position of the desired item on the image displaying unit 14.

(Second Embodiment)

When a scroll operation for an image displayed on the image displaying unit 14 is performed, though each of one or more selection possible positions for one or more items such as an "icon" and a "word" is changed, each of one or more selection possible positions for one or more items such as a "menu" is not changed. In the second embodiment, each of the selection possible positions for the items such as a "menu" is treated as a non-changeable selection possible position, and each of the selection possible positions for the items such as an "icon" and a "word" is treated as a changeable selection possible position. Therefore, in this embodiment, one or more items placed at one or more changeable selection possible positions and one or more items placed at one or more non-changeable selection possible positions are simultaneously displayed on the image displaying unit 14.

Figure 11:
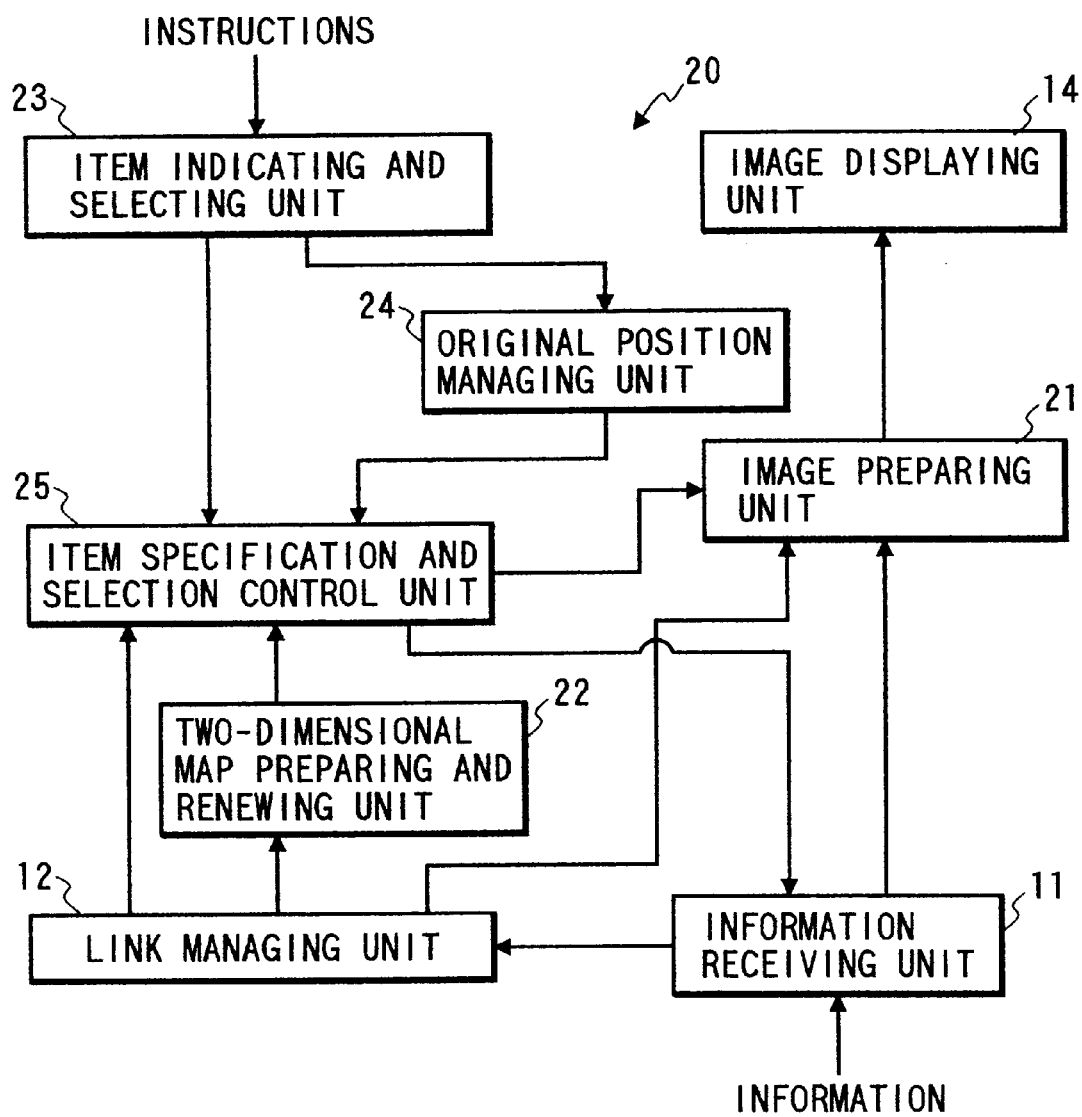
FIG. 11 is a block diagram of an item selecting apparatus according to a second embodiment of the present invention.

FIG. 11 is a block diagram of an item selecting apparatus according to a second embodiment of the present invention.

As shown in FIG. 11, an item selecting apparatus 20 comprises the information receiving unit 11, the link managing unit 12, a two-dimensional map preparing and renewing unit 22 for preparing a two-dimensional map indicating a relative positional relationship between each pair of items according to the positional relationship among the items managed in the link managing unit 12, and renewing the two-dimensional map to an updated two-dimensional map each time a scroll operation is performed for the image displayed on the image displaying unit 14, an image preparing unit 21 for determining a display layout of one or more fixed items determined in advance and partial pieces of information of the particular page received in the information receiving unit 11 and preparing an image of the fixed items and the partial pieces of information arranged according to the display layout on condition that the image is composed of a fixed image formed by the fixed items and a changeable image formed by the partial pieces of information, the image displaying unit 14 for displaying the image of the fixed items and the partial pieces of information prepared by the image preparing unit 13 on condition that one or more items included in the partial pieces of information of the particular page are placed at one or more changeable selection possible positions in the image and the fixed items are placed at one or more non-changeable selection possible positions in the image, an item indicating and selecting unit 23 for receiving an item changing instruction indicating a series of changes from an original item displayed on the image displaying unit 14 to a particular item placed on one (right, left, upper or lower) side of the original item through one or more remarked items from a user to identify the particular item and receiving an item selecting instruction indicating the selection of the particular item in cases where it is judged by the user that the particular item agrees with a desired item, an original position managing unit 24 for specifying original coordinates (X,Y) of the original item, holding the value X of the X coordinate in cases where the remarked items and the particular item placed on the upper or lower side of the original item are indicated one after another by an indicator according to the instruction received in the item indicating and selecting unit 23 and holding the value Y of the Y coordinate in cases where the remarked items and the particular item placed on the left or right side of the original item are indicated one after another by an indicator according to the instruction received in the item indicating and selecting unit 23, and an item specification and selection control unit 25 for analyzing the series of changes of the original item received in the item indicating and selecting unit 23 while referring to the updated two-dimensional map prepared by the two-dimensional map preparing and renewing unit 15 and the value X or Y of the X or Y coordinate held in the original position managing unit 24 to specify the particular item, selecting the particular item according to the item selecting instruction and instructing the information receiving unit 11 to receive pieces of information relating to one reference page indicated by the particular item.

In the original position managing unit 24, coordinates (X,Y) at a central position of each item are adopted as values X and Y of X and Y coordinates.

Figure 12:
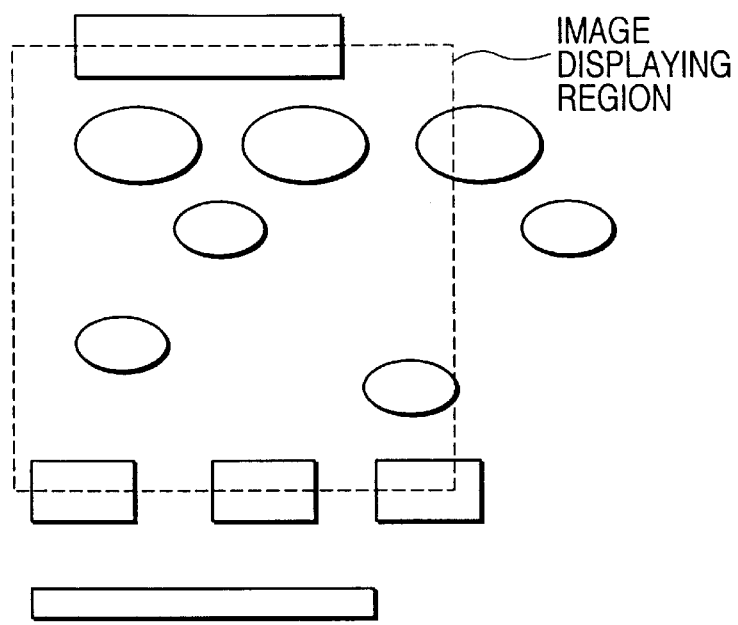
FIG. 12 shows a plurality of items placed at an image display region displayed on an image displaying unit shown in FIG. 11.
Figure 13:
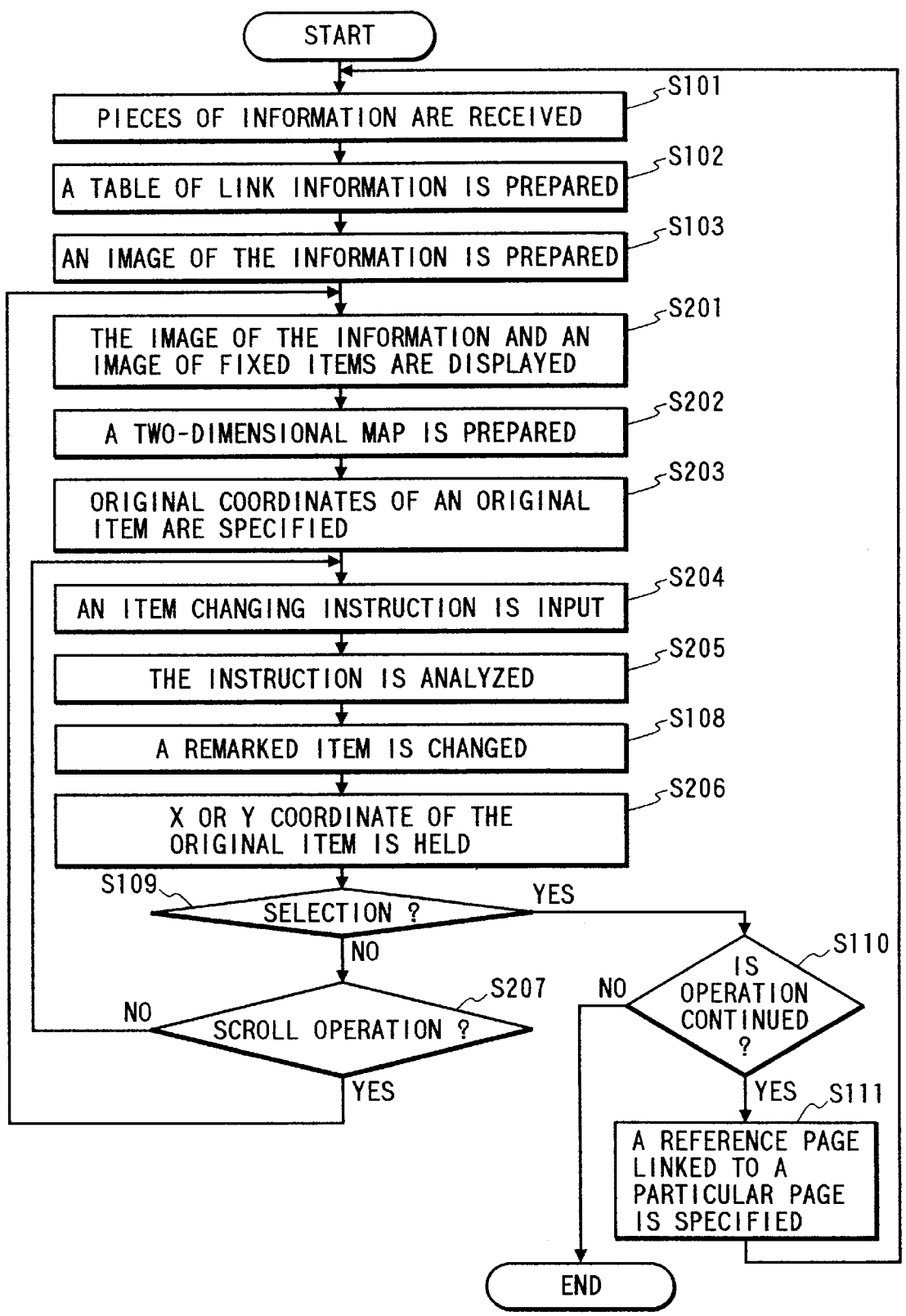
FIG. 13 shows a flow chart of an operation performed in the item selecting apparatus shown in FIG. 11.

In the above configuration, in cases where a user intends to display a plurality of items placed in an image display region shown in FIG. 12 on the image displaying unit 14 by performing a scroll operation, a flow chart of an operation performed in the item selecting apparatus 20 is shown in FIG. 13.

Figure 14:
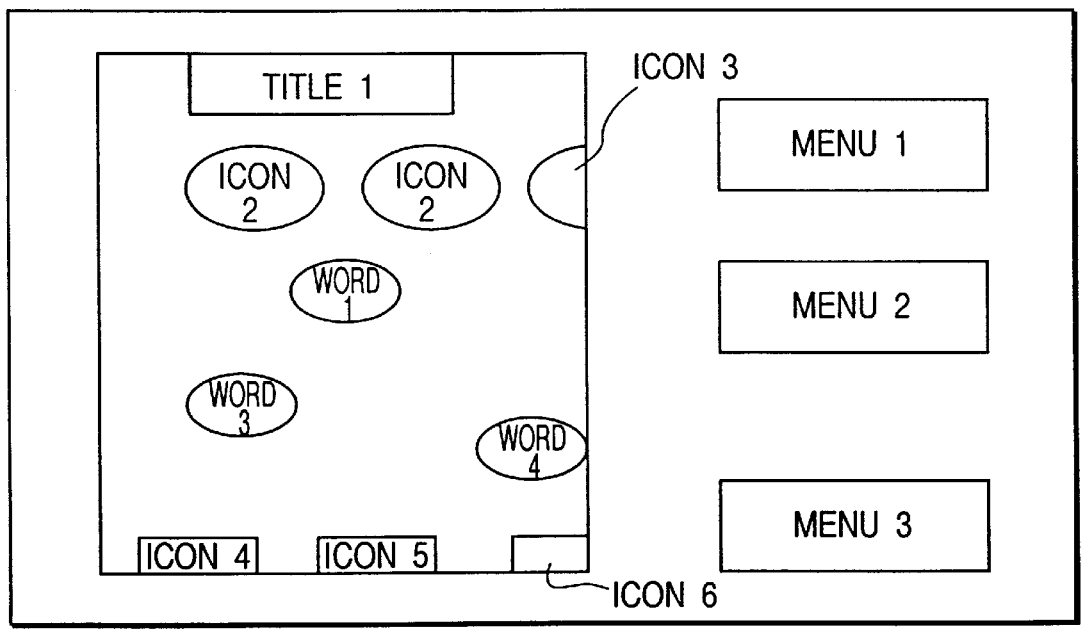
FIG. 14 shows an example of an image displayed on the image displaying unit.

As shown in FIG. 13, when a plurality of items are placed in the image display region, pieces of information including a plurality of pieces of page information indicated by the items are obtained (step S101), and a table of the pieces of link information is prepared in the link managing unit 12 (step S102). Thereafter, a display layout of the pieces of information is determined, an image of the pieces of information arranged according to the display layout is prepared in the image preparing unit 13 (step S103), the image of the pieces of information is displayed in a changeable region of an image plane prepared by the image displaying unit 14, and an image of one or more fixed items is displayed in a non-changeable region of the image plane (step S201). An image displayed on the image displaying unit 14 is shown in FIG. 14. That is, the items such as "title 1", "icon 1", "icon 2", "icon 3", "word 1", "word 3", "word 4", "icon 4", "icon 5" and "icon 6" are placed at a plurality of changeable selection possible positions of the changeable region, and the fixed items such as "menu 1", "menu 2" and "menu 3" are placed at a plurality of non-changeable selection possible positions of the changeable region.

Thereafter, a two-dimensional map is prepared in the two-dimensional map preparing unit 15 (step S202). An example of the two-dimensional map is shown in FIG. 15. As shown in FIG. 15, in cases where the "right" button of the indicated item changing switch 16a is, for example, pushed when the item "icon 6" is indicated by the indicator, an item indicated by the indicator is changed to the item "menu 3". Also, original coordinates (X,Y) of an original item indicated by the indicator are specified by the original position managing unit 24 (step S203).

Figure 16:
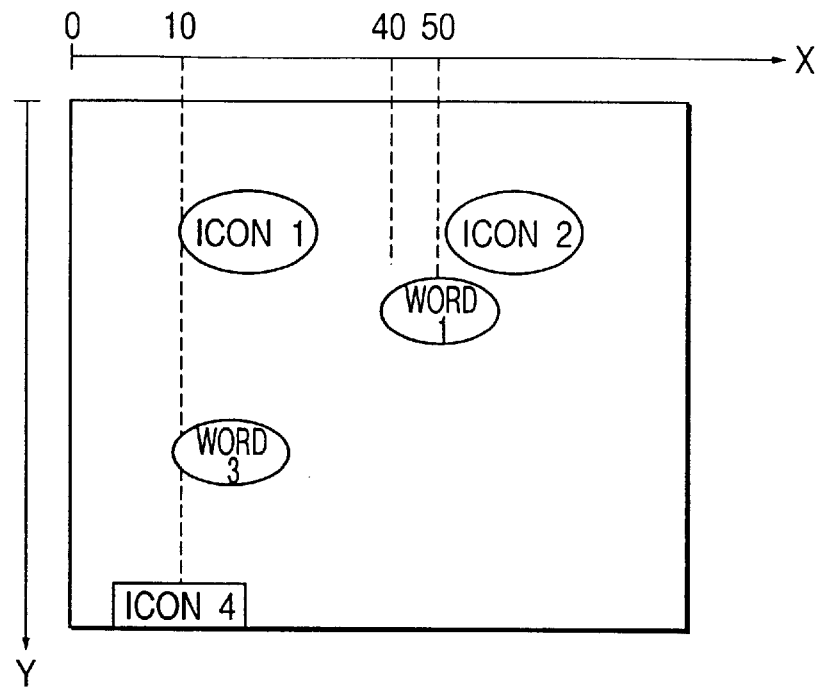
FIG. 16 shows (X,Y) coordinates of an original item and (X,Y) coordinates of each remarked item shown in FIG. 14.

Thereafter, when an item changing instruction indicating a change of the original item to a remarked item is input to the item indicating and selecting unit 23 by the user (step S204), the item changing instruction is analyzed by the item specification and selection control unit 25 while referring to both the two-dimensional map and the original coordinates (X,Y) of the original item to specify the remarked item (step S205). For example, when the user pushes the "up" button of the indicated item changing switch 16a on condition that the item "icon 4" is, for example, indicated by the indicator as an original item, a remarked item indicated by the indicator is changed to the item "word 3" according to the two-dimensional map (step S108). In this case, because the remarked item "word 3" is placed on the upper side of the original item "icon 4", as shown in FIG. 16, a value X=10 of the X coordinate of the original item "icon 4" is held in the original position managing unit 24, and a value Y of the Y coordinate of the original item "icon 4" specified in the original position managing unit 24 is changed to a value Y of the Y coordinate of the remarked item "word 3" (step S206). The remarked item "word 3" is treated as an original item. Thereafter, when the user again pushes the "up" button of the indicated item changing switch 16a, the remarked item indicated by the indicator is changed to the item "word 1" according to the two-dimensional map. In this case, because the remarked item "word 1" is placed on the upper side of the original item "word 3", the value X=10 of the X coordinate of the original item "icon 4" is held in the original position managing unit 24, and the value Y of the Y coordinate specified in the original position managing unit 24 is changed to a value Y of the Y coordinate of the remarked item "word 1" (step S206). The remarked item "word 1" is treated as an original item. Thereafter, when the user again pushes the "up" button of the indicated item changing switch 16a, because the value X=10 of the X coordinate of the original item "icon 4" is held in the original position managing unit 24, though an X coordinate of the item "icon 2" is closer to an X coordinate of the original item "word 1" than an X coordinate of the item "icon 1", the remarked item indicated by the indicator is changed to the item "icon 1" according to the two-dimensional map. Thereafter, the user pushes the selection switch 16b, and the item "icon 1" is selected (step S109).

Accordingly, assuming that any coordinate of the original item is not held, even though the user desires to select the item "icon 1" visually placed on the upper side of the item "icon 4" by pushing the "up" button of the indicated item changing switch 16a three times, because the X coordinate of the item "icon 2" is closer to the X coordinate of the item "word 1" than the X coordinate of the item "icon 1", in cases where the user pushes the "up" button of the indicated item changing switch 16a three times, the item "icon 2" is undesirably treated as the remarked item and is selected. However, because the X coordinate of the original item is held in the original position managing unit 24, the user can selects the item "icon 1" visually placed on the upper side of the item "icon 4". That is, the user can selects a desired item while operating the item indicating and selecting unit 23 according to a visual impression obtained from the image displayed on the image displaying unit 14.

Figure 17:
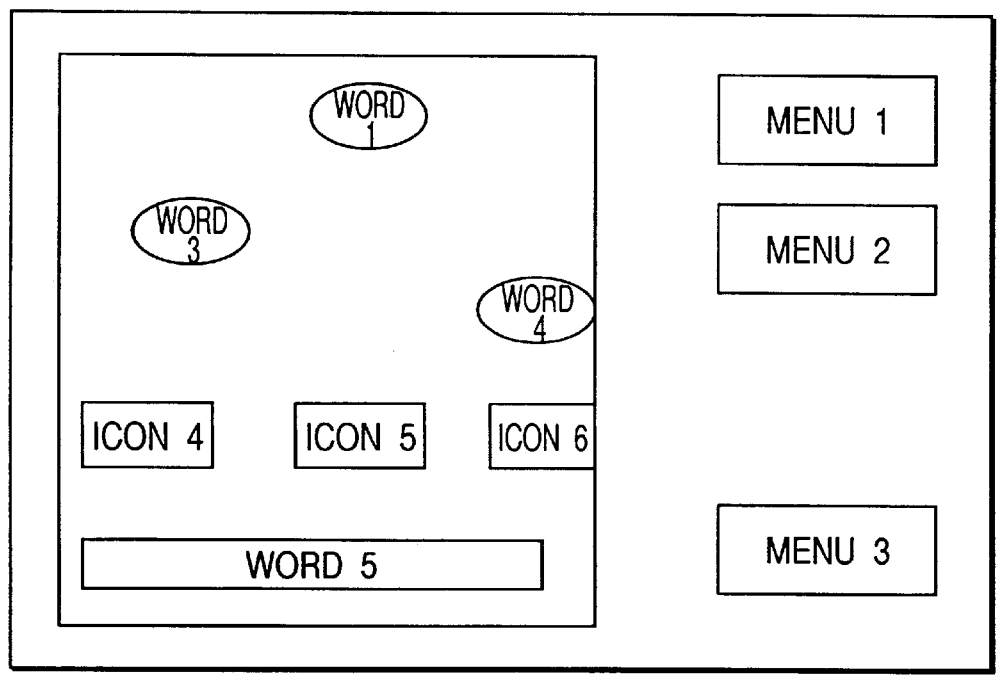
FIG. 17 shows another image displayed on the image displaying unit.

Thereafter, in cases where the remarked item is not selected in the step S109, it is judged whether or not the image displayed on the image displaying unit 14 is changed according to a scroll operation (step S207). In cases where any scroll operation is not performed, because the change of the image displayed on the image displaying unit 14 is not required, the steps 204 is repeated. In contrast, in cases where a scroll operation is performed, the procedure returns to the step S201, the image displayed on the image displaying unit 14 is renewed to an updated image, and the two-dimensional map is renewed to an updated two-dimensional map (step S202). For example, the updated image is shown in FIG. 17, and the updated two-dimensional map is shown in FIG. 18.

Next, a case that a remarked item is placed on a right side of an original item is described.

In case where an image shown in FIG. 19A is displayed on the image displaying unit 14, a portion of a two-dimensional map is shown in FIG. 20. When the user pushes the "right" button of the indicated item changing switch 16a on condition that the item "word 1" is indicated by the indicator (step S204), the change of the original item is analyzed by the item specification and selection control unit 25 while referring to the two-dimensional map and the original coordinates (X,Y) of the original item to specify the remarked item (step S205). Therefore, a remarked item indicated by the indicator is changed to the item "image 1" according to the two-dimensional map. In this case, because the remarked item "image 1" is placed on the right side of the original item "word 1", as shown in FIG. 19B, a value Y=25 of the Y coordinate of the original item "word 1" is held in the original position managing unit 24, and a value X of the X coordinate of the original item "word 1" specified in the original position managing unit 24 is changed to a value X of the X coordinate of the remarked item "image 1" (step S206). The remarked item "image 1" is treated as an original item. Thereafter, when the user again pushes the "right" button of the indicated item changing switch 16a (step S204), the change of the original item is analyzed by the item specification and selection control unit 25 while referring to the two-dimensional map and the original coordinates (X,Y) of the original item to specify a remarked item (step S205). In this case, though three items "menu 1", "menu 2" and "menu 3" are placed on the right side of the original item "image 1", because the value Y=25 of the Y coordinate of the original item "word 1" is held in the original position managing unit 24, a remarked item indicated by the indicator is changed to the item "menu 1" according to the two-dimensional map.

Also, when the user pushes the "right" button of the indicated item changing switch 16a on condition that the item "word 2" is indicated by the indicator (step S204), a remarked item indicated by the indicator is changed to the item "image 1" according to the two-dimensional map, and a value Y=65 of the Y coordinate of the original item "word 2" is held in the original position managing unit 24 (step s206). Thereafter, when the user again pushes the "right"

button of the indicated item changing switch 16a (step S204), because the value Y=65 of the Y coordinate of the original item "word 1" is held in the original position managing unit 24, a remarked item indicated by the indicator is changed to the item "menu 3" according to the two-dimensional map.

Accordingly, because the X or Y coordinate of the original item is held in the original position managing unit 24, the user can selects a desired item with a natural operational feeling while operating the item indicating and selecting unit 23 according to a visual impression obtained from the image displayed on the image displaying unit 14.

(Third Embodiment)

In a third embodiment, a prototype of a two-dimensional map for all pieces of items of one page is prepared for each page according to the first embodiment, and a revised two-dimensional map in which a portion agreeing with that of the prototype of the two-dimensional map is indicated by a blank is prepared.

Figure 21:
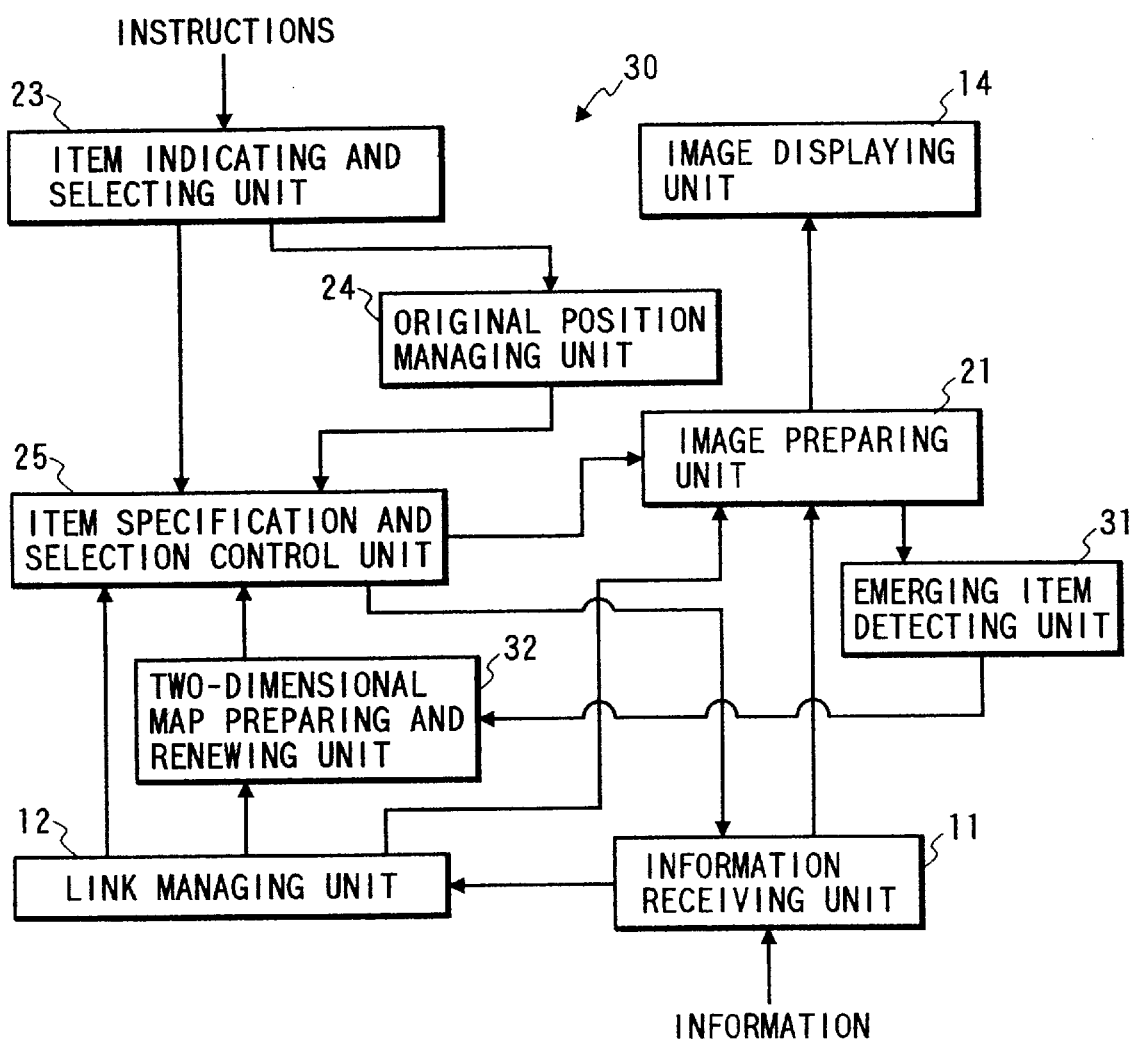
FIG. 21 is a block diagram of an item selecting apparatus according to a third embodiment of the present invention.

FIG. 21 is a block diagram of an item selecting apparatus according to a third embodiment of the present invention.

As shown in FIG. 21, an item selecting apparatus 30 comprises
- the information receiving unit 11, the link managing unit 12, the image preparing unit 21, the image displaying unit 14, an emerging item detecting unit 31 for detecting one or more items newly emerging in the image prepared in the image preparing unit 21 each time a scroll operation is performed for the image displayed on the image displaying unit 14,
- a two-dimensional map preparing and renewing unit 32 for preparing a prototype of a two-dimensional map indicating a relative positional relationship between each pair of items displayed on the image displaying unit 14 according to the positional relationship among the items managed in the link managing unit 12 and preparing a revised two-dimensional map while paying attention to the emerging items detected in the emerging item detecting unit 31 each time a scroll operation is performed for the image displayed on the image displaying unit 14,
- the item indicating and selecting unit 23, the original position managing unit 24, and the item specification and selection control unit 25.

In the above configuration, an operation of the item selecting apparatus 30 is described with reference to FIG. 22.

Figure 22:
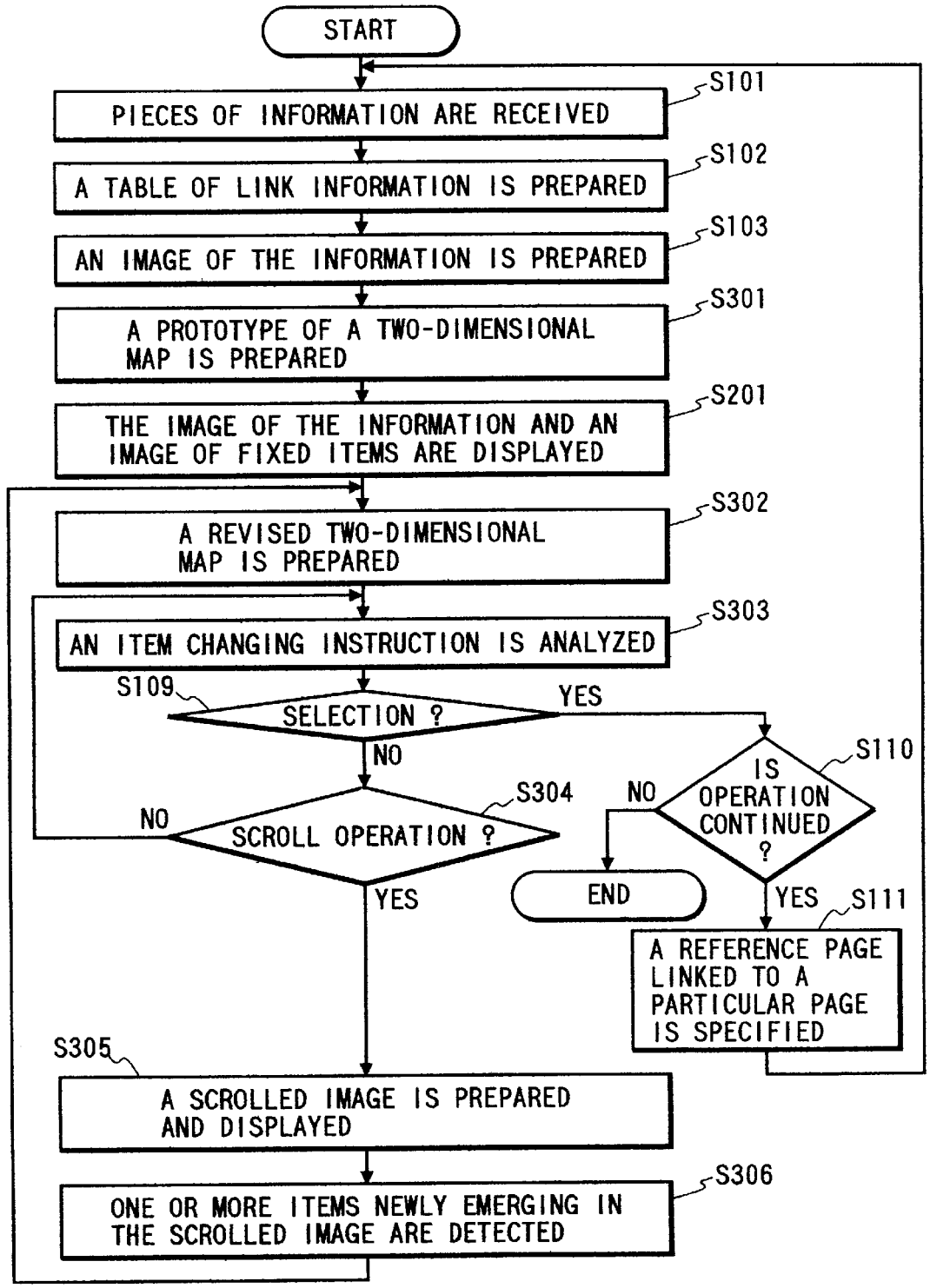
FIG. 22 shows a flow chart of an operation performed in the item selecting apparatus shown in FIG. 21.

As shown in FIG. 22, when pieces of information relating to a particular page is received in the information receiving unit 11, an image of items placed at changeable selection possible positions and fixed items placed at non-changeable selection possible positions is prepared in the same manner as in the second embodiment (steps S101 to S103), a prototype of a two-dimensional map for all items (or page information) of the particular page is prepared in the two-dimensional map preparing and renewing unit 32 in the same manner as in the first embodiment (step S301), and the image of the pieces of information is displayed in a changeable region of an image plane prepared by the image displaying unit 14, and an image of one or more fixed items is displayed in a non-changeable region of the image plane (step S201). An example of the image displayed on the image displaying unit 14 is shown in FIG. 14, and an example of the prototype of the two-dimensional map for the particular page is shown in FIG. 10.

Thereafter, a revised two-dimensional map corresponding to the image displayed on the image displaying unit 14 is prepared in the two-dimensional map preparing and renewing unit 32 (step S302). For example, in cases where the image shown in FIG. 14 is displayed on the image displaying unit 14, a revised two-dimensional map shown in FIG. 23 is prepared. That is, an item placed on the right side of the item "title" or the item "icon 3" is not the item "title" or the item "icon 3" indicated in the prototype of the two-dimensional map but the fixed item "menu 1" indicated in the revised two-dimensional map, an item placed on the right side of the item "word 2" is the fixed item "menu 2", and an item placed on the right side of the item "word 4" is the fixed item "menu 3". In this case, because items to be placed in a plurality of blank portions of the revised two-dimensional map are the same as those indicated in the prototype of the two-dimensional map, any item is not indicated in the blank portions. Therefore, a renewed two-dimensional map obtained by combining the prototype of the two-dimensional map and the revised two-dimensional map is the same as that shown in FIG. 15.

Thereafter, when an item changing instruction indicating a change of an original item to a remarked item placed on one side of the original item is input to the item indicating and selecting unit 23 by the user, the item changing instruction is analyzed by the item specification and selection control unit 25 while referring to the prototype of the two-dimensional map, and the revised two-dimensional map and the original coordinates (X,Y) of the original item (step S303), the remarked item is specified and indicated by the indicator (step S108). In this case, the revised two-dimensional map is referred before the prototype of the two-dimensional map is referred. In cases where any item is not listed at a column of a prescribed direction for the original item in the revised two-dimensional map, the prototype of the two-dimensional map is referred. Thereafter, an X or Y coordinate of the original item is held in the original position managing unit 24 (step S206), and it is judged whether or not the remarked item is selected according to an item selecting instruction under the control of the item specification and selection control unit 25 (step S109). In cases where the remarked item is selected, the steps S110 and Slll are performed. In contrast, in cases where the remarked item is not selected, it is judged whether or not the image displayed on the image displaying unit 14 is changed according to a scroll operation (step S304). In cases where any scroll operation is not performed, the step S303 is repeated to analyze a next item changing instruction until the remarked item agreeing with a particular item is selected in the same manner as in the second embodiment.

In contrast, in cases where a scroll operation is performed for the image displayed on the image displaying unit 14, a scrolled image is prepared as an updated image and is displayed on the image displaying unit 14 (step S305). Thereafter, one or more items newly emerging in the scrolled image are detected in the emerging item detecting unit 31 (step S306), and a revised two-dimensional map is newly prepared in the two-dimensional map preparing and renewing unit 32 while considering the emerging items and a scroll direction in the scroll operation (step S302).

For example, in cases where a right scroll is performed, because the items displayed on the image displaying unit 14 is moved in the left direction, an item detected in the emerging item detecting unit 31 is emerged on the right side of the scrolled image. Therefore, a revised two-dimensional map can be newly prepared by changing one or more items placed in the "right direction" of the revised two-dimensional map. In cases where the item "word 2" is detected in the emerging item detecting unit 31 when the right scroll is performed for the image, as shown in FIG. 24, the item "menu 2" indicated for the item "word 1" in the revised two-dimensional map is deleted, and the item "menu 2" is added for the item "word 2" in the revised two-dimensional map to indicate that an item placed on the right side of the item "word 2" is the item "menu 2".

Accordingly, the renewal of the two dimensional map can be easily performed.

(Fourth Embodiment)

In cases where the number of items in an image displayed on the image displaying unit 14 is large, it is troublesome to select a desired item, and it takes a lot of time to select a desired item. Therefore, in a fourth embodiment, a large number of items existing in a page are classified into a plurality of groups in a tree structure (or a hierarchy structure) to easily select a desired item at a short time.

Figure 25:
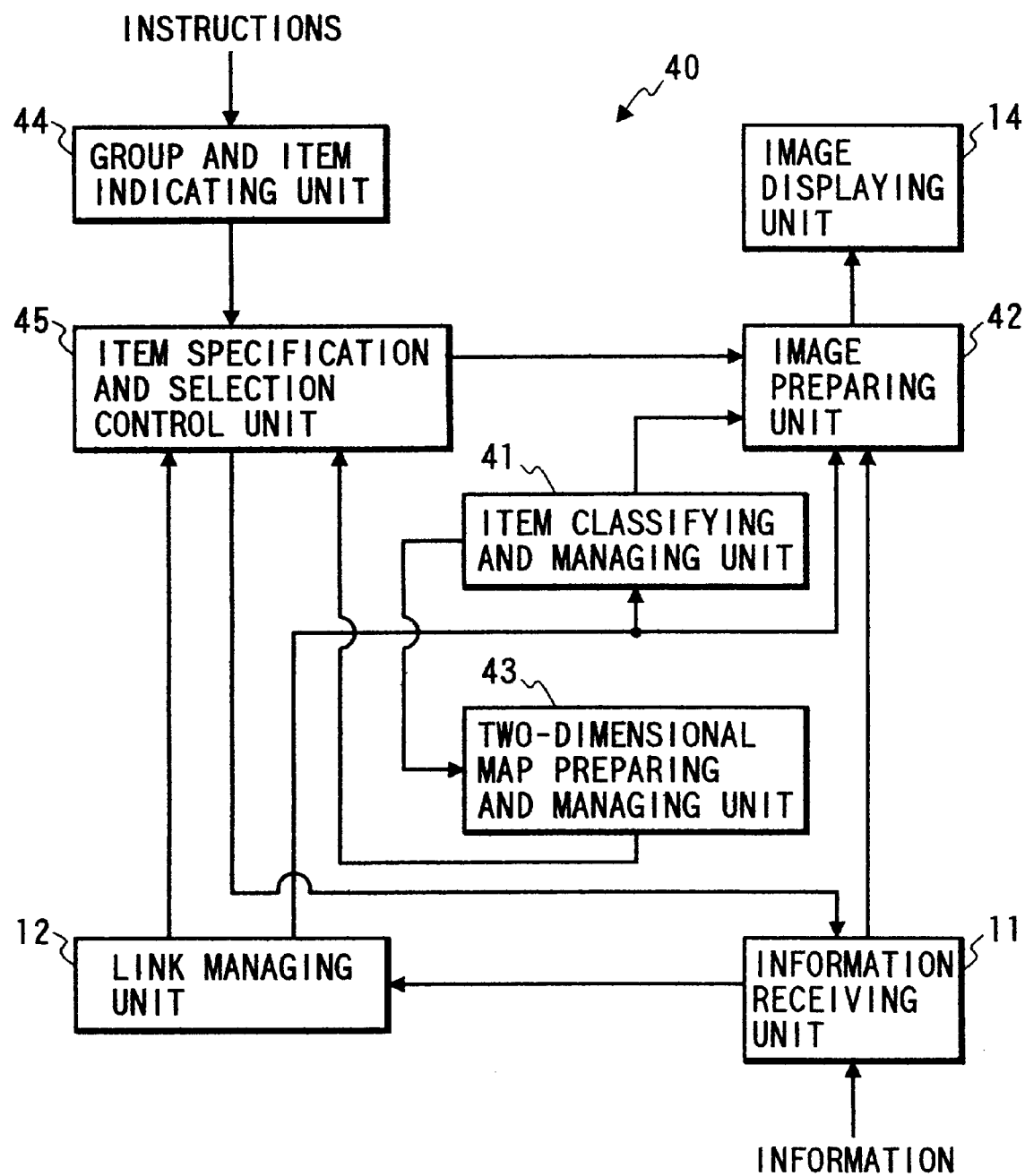
FIG. 25 is a block diagram of an item selecting apparatus according to a fourth embodiment of the present invention.

FIG. 25 is a block diagram of an item selecting apparatus according to a fourth embodiment of the present invention.

As shown in FIG. 25, an item selecting apparatus 40 comprises the information receiving unit 11, the link managing unit 12 for detecting a large number of pieces of link information respectively indicating a link relationship between the particular page and a reference page from the pieces of information received in the information receiving unit 11, treating each of the pieces of link information as an item and managing a positional relationship among the items in the particular page, an item classifying and managing unit 41 for classifying the items denoting the pieces of link information managed in the link managing unit 12 into a plurality of item groups hierarchically ranked in a tree structure on condition that the items are allocated to a plurality of items groups ranked to the same level for each level and managing the items allocated to the item groups;

an image preparing unit 42 for determining a display layout of the pieces of information received in the information receiving unit 11 and preparing an image of the pieces of information arranged according to the display layout on condition that the image is composed of a plurality of sub-images arranged in the tree structure and respectively corresponding to one item group prepared in the item classifying and managing unit 41 the image displaying unit 14 for displaying the image prepared in the image preparing unit 42 to place each item group in a selection possible region and place each of the items at a selection possible position in the image, a two-dimensional map preparing and managing unit 43 for preparing a two-dimensional group map indicating a relative positional relationship between each pair of item groups ranked to the same level in the item classifying and managing unit 41, preparing a two-dimensional map indicating a positional relationship between each pair of items existing in one item group for each of the item groups ranked to the lowest level and managing the two-dimensional group maps and the two-dimensional maps, a group and item indicating unit 44 for indicating one of the item groups, which are placed at the selection possible regions and are displayed on the image displaying unit 14, for each level to select a plurality of item groups in the order of levels of the item groups and selecting a particular item arranged in the selected item group of the lowest level, and an item specification and selection control unit 45 for analyzing the indication of each item group performed in the item indicating and selecting unit 16 while referring to the two-dimensional group maps prepared by the two-dimensional map preparing and managing unit 43 and specifying the particular item according to one positional relationship indicated by the two-dimensional map.

An eye detecting unit (or an observed group detecting unit) is used as the group and item indicating unit 44. Also, a "select" button and a "cancel" button are arranged in the group and item indicating unit 44.

The items are classified according to one of two classifying methods in the item classifying and managing unit 41. In a first classifying method, the items included in the pieces of information are classified according to a structure of a document in which the pieces of information are included. In a second classifying method, the items are classified according to types of the items. In this embodiment, the items are, for example, classified according to the first classifying method.

In the first classifying method, in cases where the items are divided into a plurality of item groups respectively corresponding to one paragraph, because each paragraph is composed of a title of the paragraph, one or more illustrations, a text, one or more selection possible keywords and the like, each item group of items are again divided into a plurality of item sub-groups. In this case, a two-dimensional group map is prepared for each paragraph in the two-dimensional map preparing and managing unit 43.

In the above configuration, an operation of the item selecting apparatus 40 is described with reference to FIG. 26.

Figure 26:
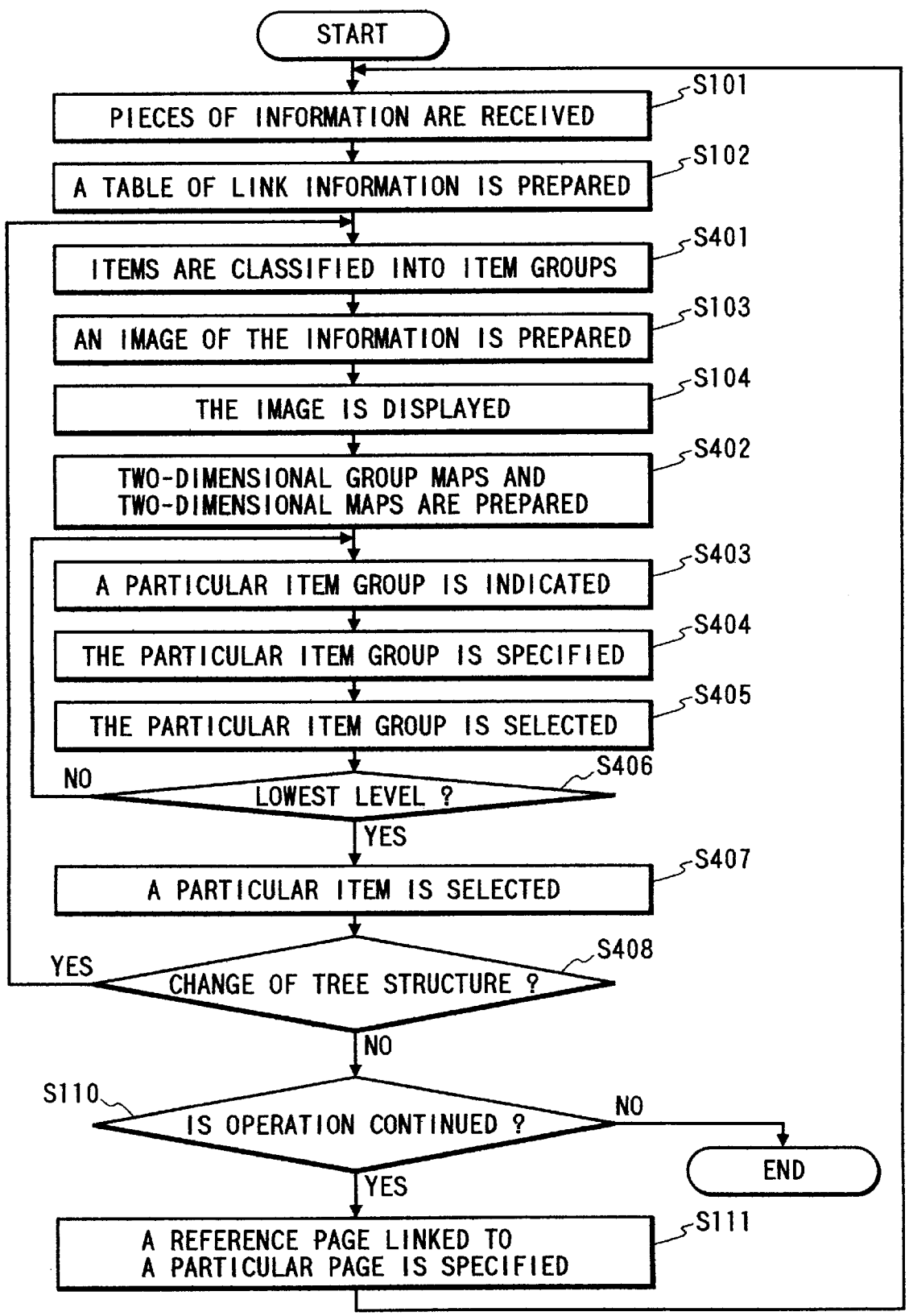
FIG. 26 shows a flow chart of an operation performed in the item selecting apparatus shown in FIG. 25.
Figure 27:
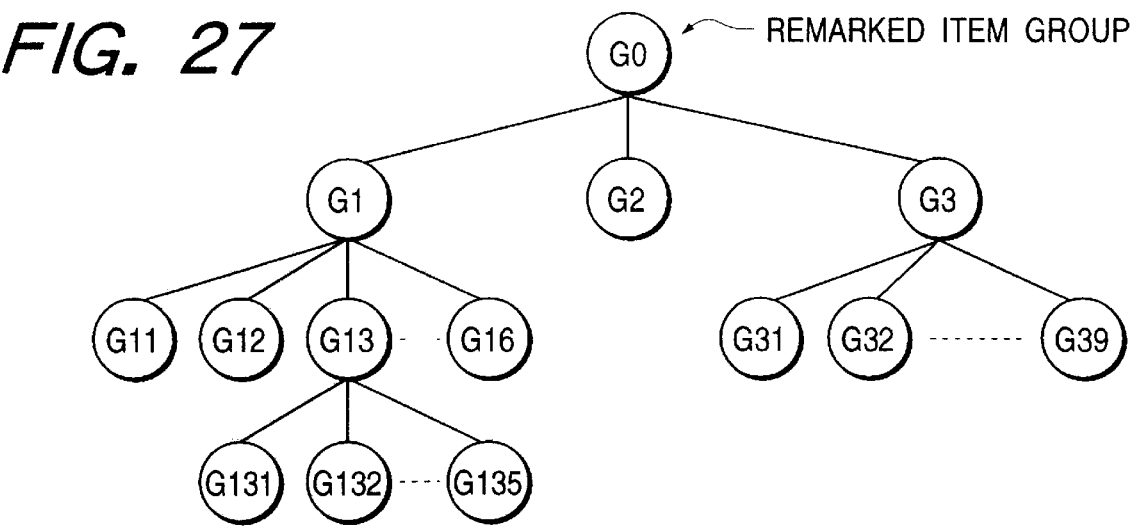
FIG. 27 shows a tree structure of a plurality of item groups ranked to various levels.

As shown in FIG. 26, when pieces of information of a particular page are received in the information receiving unit 11 (step S101), a table of the pieces of link information (or items) is prepared in the link managing unit 12 (step S102). Thereafter, the items are classified into a plurality of item groups hierarchically ranked in a tree structure, and the items allocated to the item groups are managing in the item classifying and managing unit 41 (step S401). Thereafter, a display layout of the pieces of information is determined, an image of the pieces of information arranged according to the display layout is prepared in the image preparing unit 42 on condition that the image is composed of a plurality of sub-images arranged in the tree structure and respectively corresponding to one item group (step S103). For example, a tree structure of a plurality of item groups ranked to various levels is shown in FIG. 27. As shown in FIG. 27, an item group G0 is ranked to the highest level, a plurality of item groups G1 to G3 subordinate to the item group G0 are ranked to the second level, a plurality of item groups G11 to G16 subordinate to the item group G1 are ranked to the third level, a plurality of item groups G31 to G39 subordinate to the item group G3 are ranked to the third level, and a plurality of item groups G131 to G135 subordinate to the item group G13 are ranked to the fourth level.

Figure 28:
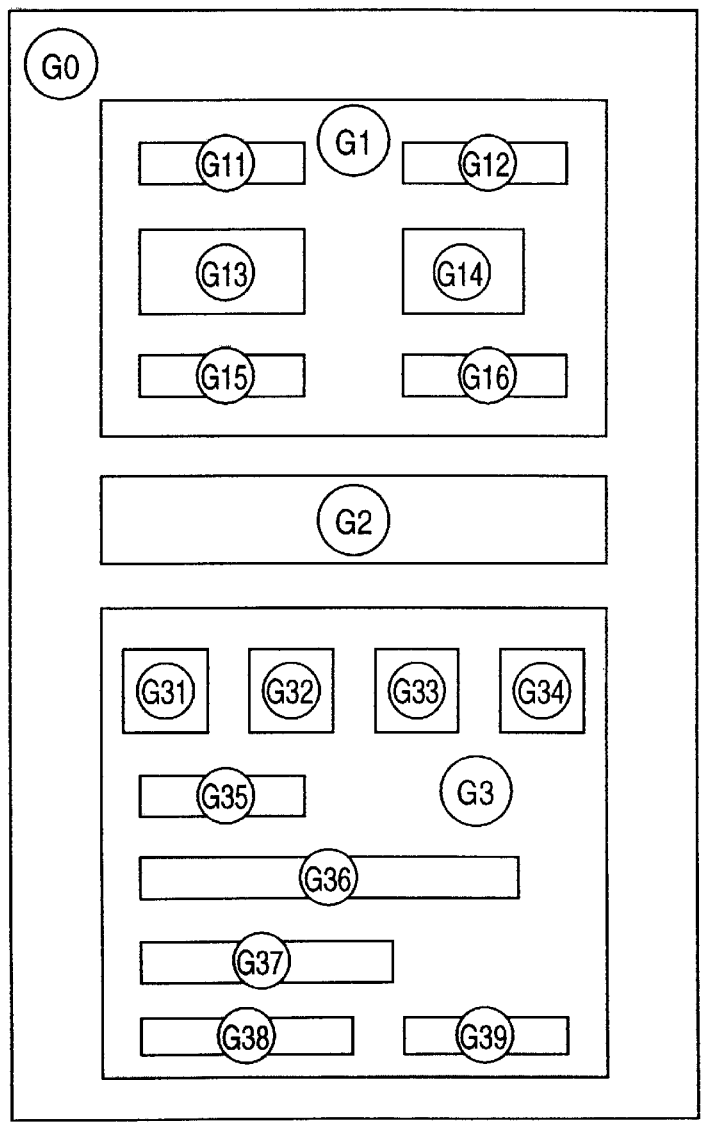
FIG. 28 shows an example of an image composed of three sub-images according to the fourth embodiment.

Thereafter, the image of the pieces of information is displayed on the image displaying unit 14 (step S104). In this case, one or more items arranged in the same item group are displayed in a sub-image of the image. For example, an image shown in FIG. 28 is displayed on the image displaying unit 14. As shown in FIG. 28, the image for the item group G0 is divided to three sub-images for the item groups G1 to G3, and a plurality of item groups exists in each of the item groups G1 and G3.

Figure 29:
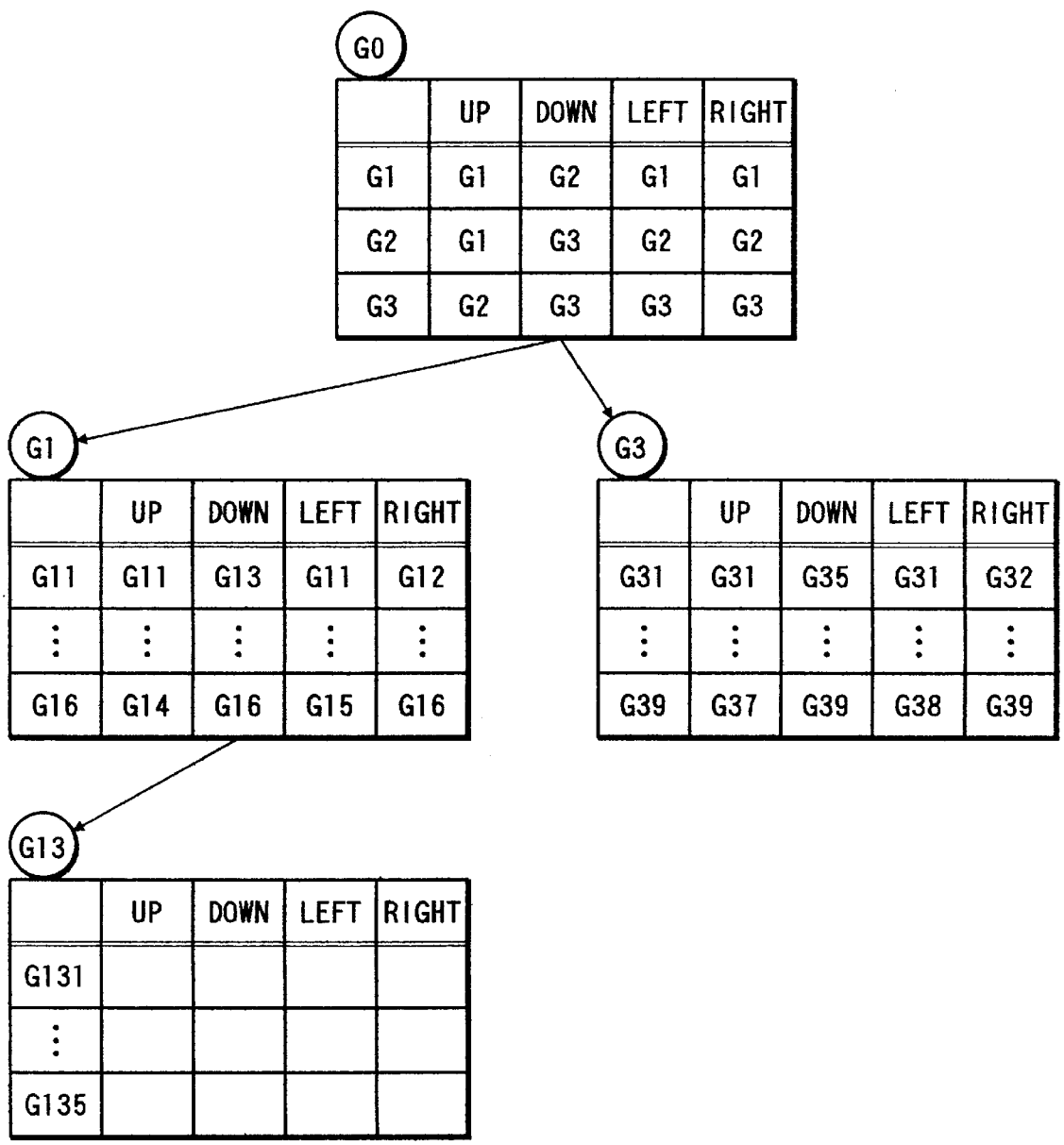
FIG. 29 shows a plurality of two-dimensional group maps prepared for each of remarked item groups according to the fourth embodiment.

Thereafter, one two-dimensional group map indicating a relative positional relationship between each pair of item groups ranked to the same level is prepared for each of the levels in the two-dimensional map preparing and managing unit 43, and one two-dimensional map indicating a positional relationship between each pair of items existing in one item group is prepared for each of the item groups ranked to the lowest level (step S402). For example, as shown in FIG. 29, one two-dimensional group map for the item group G0 ranked to the first level indicates a relative positional relationship between each pair of item groups ranked to the second level, one two-dimensional group map for the item group G1 ranked to the second level indicates a relative positional relationship between each pair of item groups ranked to the third level.

Figure 30:
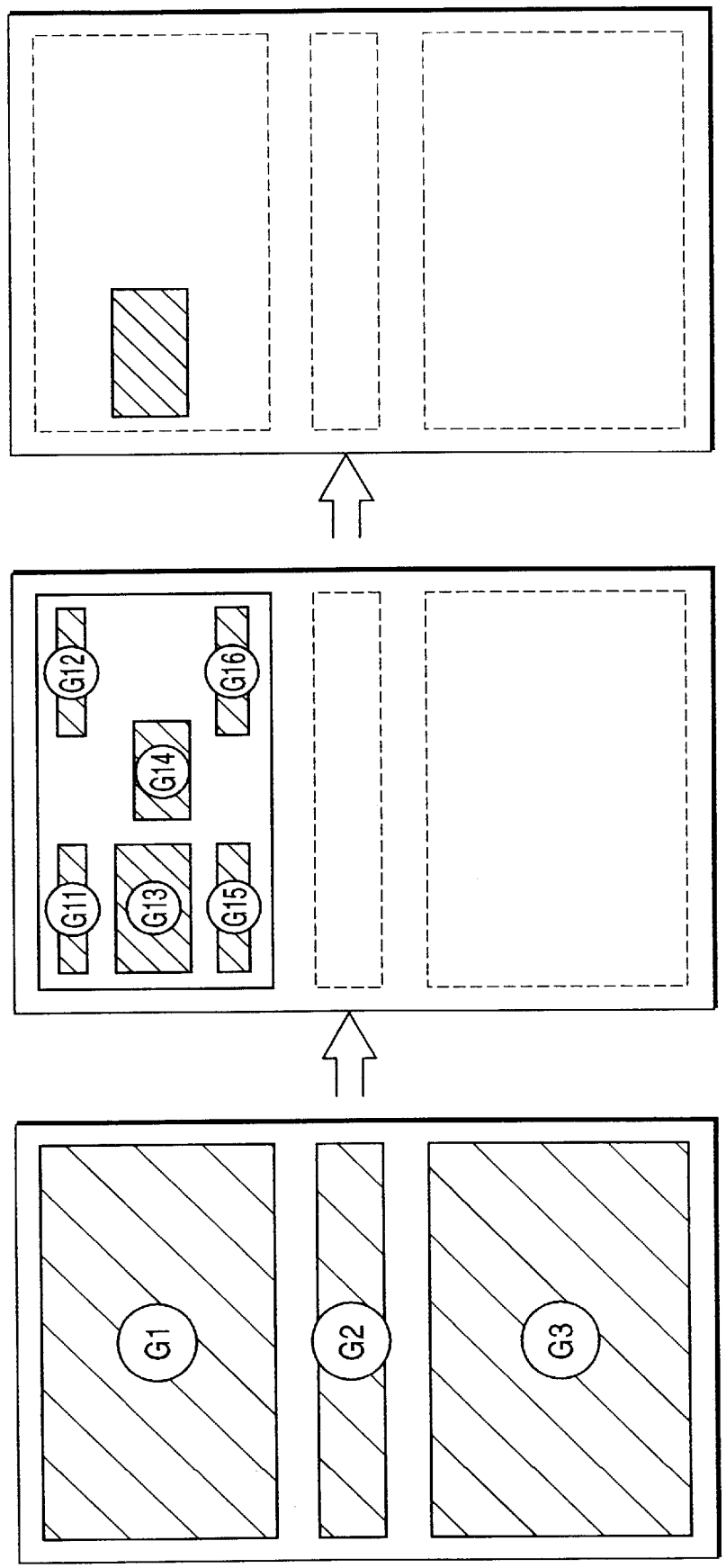
FIG. 30 shows a change of item groups to be able to be selected.
Figure 31:
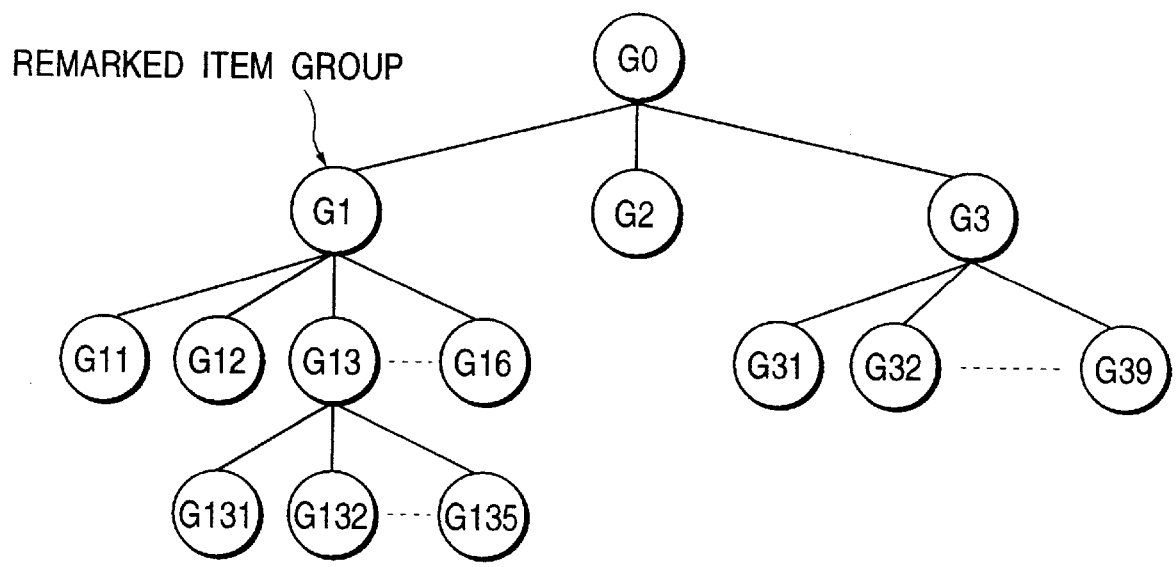
FIG. 31 shows the tree structure of the item groups on condition that a remarked item group is changed to an item group G1.

Thereafter, when a user observes an image displayed on the image displaying unit 14 while using the group and item indicating unit 44 and an eye of the user is directed to a particular item group in which a keyword desired by the user is included (step S403), the particular item group is specified by the item specification and selection control unit 45 while referring to one two-dimensional group map for an item group corresponding to the image, and the particular item group is automatically highlighted (S404). For example, as shown in FIG. 30, when the item group G1 is specified as the particular item group, the item group G1 is automatically highlighted while referring to one two-dimensional group map for the item group G0. Thereafter, when the "select" button of the group and item indicating unit 44 is pushed by the user, the particular item group is selected (step S405), and a remarked item group is changed from the item group G0 to the item group G1 as shown in FIG. 31. Therefore, the selection of one or more item groups not selected becomes impossible, and one or more items included in the particular item group are treated as candidates for a particular item desired to be selected. Thereafter, the operation that the particular item group is divided into a plurality of item groups ranked to a next low level according to the two-dimensional group map for the particular item group is repeated until one particular item group ranked to the lowest level is selected in the step S405 (step S406).

Therefore, in cases where the division of the particular item group is repeated, the particular item existing in the particular item group ranked to the lowest level can be easily indicated by the indicator even though a large number of items exist in the particular page. For example, as shown in FIG. 30, after the selection of the item group G1, the item group G13 is selected, and an item existing in the item group G13 is selected in the same manner as in the first embodiment.

Thereafter, the particular item is selected according to one two-dimensional map for the particular item group ranked to the lowest level in the same manner as in the first embodiment (step S407), and it is judged whether or not the change of the tree structure of the item groups is required by the user (step S408). In cases where the change of the tree structure of the item groups is required, the procedure returns to the step S401, and the two-dimensional group map are renewed in the step S402. In contrast, in cases where the change of the tree structure of the item groups is not required, the procedure proceeds to the step S110.

Accordingly, because a plurality of items are classified into a plurality of item groups and one two-dimensional group map is prepared for each item group, even though the number of items in one page is large, a desired item can be easily selected at a short time by selecting a plurality of item groups relating to the desired item in the order of levels of the item groups.

In the fourth embodiment, the eye detecting unit is used as the group and item indicating unit 44. However, it is applicable that a button type remote control unit, a keyboard or a mouse be used as the group and item indicating unit 44.

(Fifth Embodiment)

Figure 32:
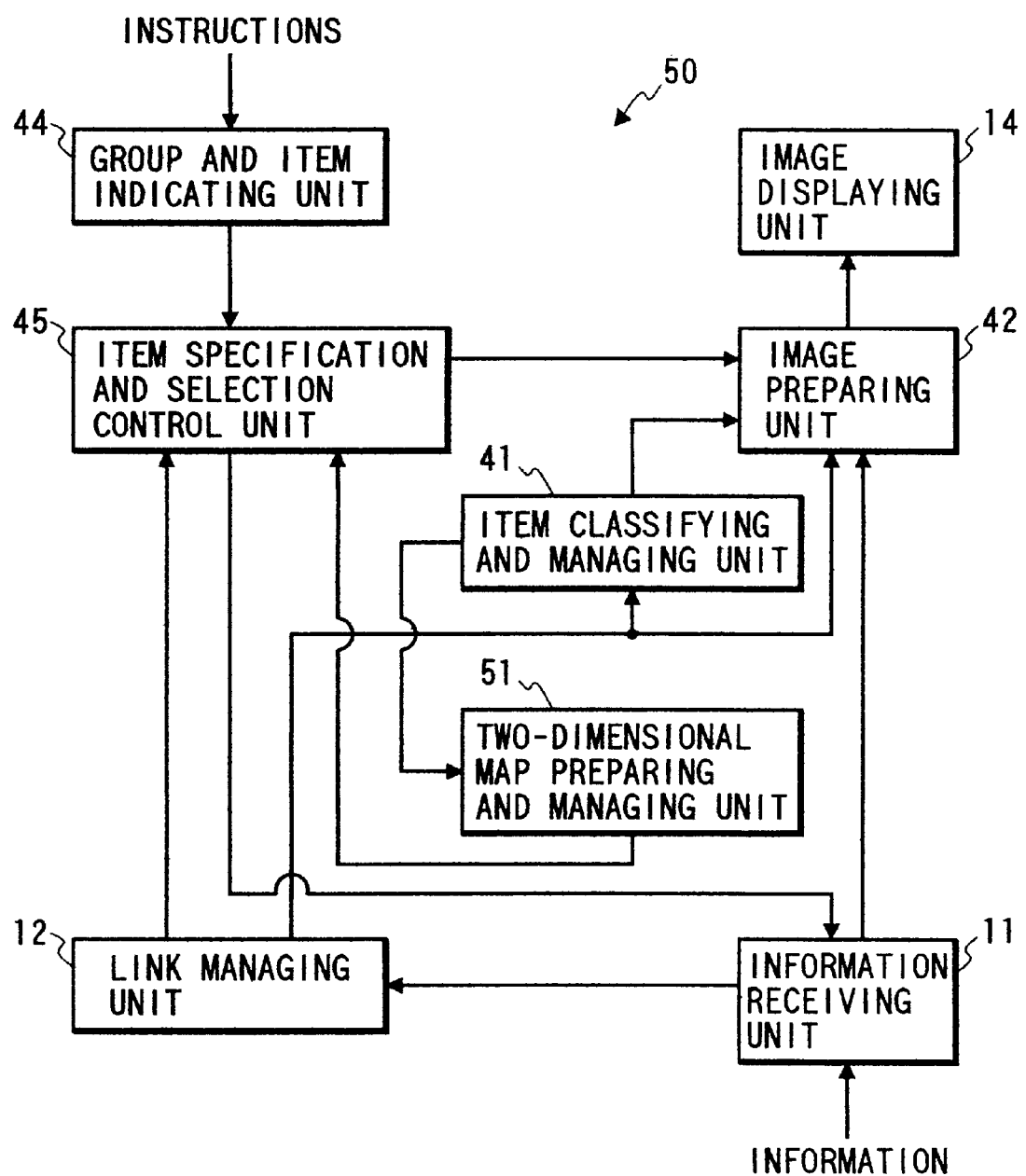
FIG. 32 is a block diagram of an item selecting apparatus according to a fifth embodiment of the present invention.

FIG. 32 is a block diagram of an item selecting apparatus according to a fifth embodiment of the present invention.

As shown in FIG. 32, an item selecting apparatus 50 comprises the information receiving unit 11, the link managing unit 12, the item classifying and managing unit 41, the image preparing unit 42, the image displaying unit 14, a two-dimensional map preparing and managing unit 51 for preparing a two-dimensional group map indicating a relative positional relationship between each pair of item groups which exist in an item group ranked to the second level and are displayed on the image displaying unit 14, revising the two-dimensional group map to indicate a relative positional relationship between each of the item groups and each of item sub-groups existing in a particular item group each time the particular item group is selected, preparing a two-dimensional map indicating a relative positional relationship between each pair of items existing in one item group for each of the item groups ranked to the lowest level and managing the two-dimensional group map and the two-dimensional maps, the group and item indicating unit 44, and the item specification and selection control unit 45.

A ten-key shown in FIG. 33 is used as the group and item indicating unit 44. For example, when a key "8", "12", "4" or "6" is pushed by a user, an indicator indicating a first item group on the image displaying unit 14 is moved to a second item group placed on the upper, lower, left or right side of the first item group. Also, when a "return" key is pushed, an item indicated by the indicator is selected.

In the above configuration, an operation of the item selecting apparatus 50 is described with reference to FIG. 34.

Figure 34:
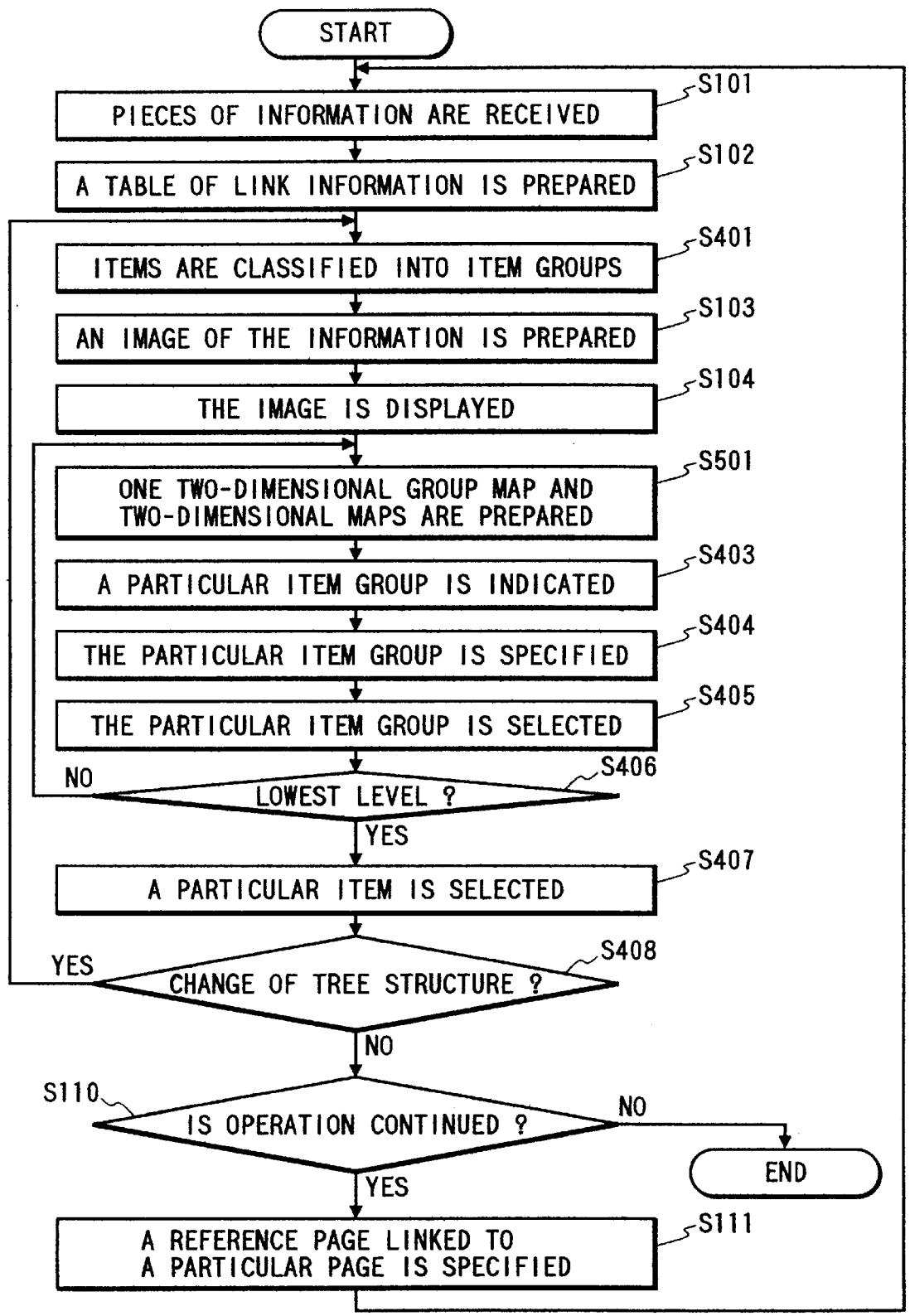
FIG. 34 shows a flow chart of an operation performed in the item selecting apparatus shown in FIG. 32.

As shown in FIG. 34, the steps S101 to S104 and S401 are performed in the same manner as in the fourth embodiment. In this case, as shown in FIG. 35A, an image of an item group G0 ranked to the first level is, for example, shown on the image displaying unit 14. The item group G0 is, for example, composed of a plurality of item groups G1 to G6 ranked to the second level. Thereafter, one two-dimensional group map for the item group G0 is prepared in the two-dimensional map preparing and managing unit 51 (step S501). For example, one two-dimensional group map shown in FIG. 36 is prepared in cases where the image shown in FIG. 35A is shown on the image displaying unit 14. In FIG. 36, a blank portion "°" denotes that an original item group indicated by an indicator is not changed even though the movement of the indicator is performed by operating the ten-key. Thereafter, the steps S403 and S404 are performed, and one of the item groups shown on the image displaying unit 14 is selected in the step S405 according to the two-dimensional group map prepared in the step S501. For example, in cases where the item group G1 is initially indicated by the indicator as a remarked item group, the remarked item group is changed to the item group G2 by pushing the key "6" of the ten-key. Thereafter, the remarked item group is changed to the item group G3 by pushing the key "2" of the ten-key, and the "return" key is pushed to select the item group G3. Therefore, as shown in FIG. 35B, a plurality of item groups G31 to G36 ranked to the third level can be selected. An enlarged view of the item group G3 is shown in FIG. 35C.

Thereafter, the step S406 is performed, and the two-dimensional group map is renewed in the two-dimensional map preparing and managing unit 51 (step S501). For example, in cases where the item group G3 is selected in the step S405, as shown in FIG. 37, one two-dimensional group map for the item group G3 is prepared, the two-dimensional group map for the item group G1 and the two-dimensional group map for the item group G3 are merged together by replacing a column of the item group G3 in the two-dimensional group map for the item group G1 with a plurality of columns of the item groups G31 to G36 in the two-dimensional group map for the item group G3, and one two-dimensional group map is obtained to select one of the item groups G31 to G36. In this merging operation, the item group G3 written as a remarked item group in the two-dimensional group map for the item group G1 is changed to one of the item groups G31 to G36, and one of the item groups G1, G2, G4, G5 and G6 is written in each of one or more blank portions "°" in the two-dimensional group map for the item group G3.

Accordingly, because the two-dimensional group map is renewed each time the user selects one item group, even though the number of items in one page is large, a desired item can be easily selected at a short time by selecting a plurality of item groups relating to the desired item in the order of levels of the item groups.

In the fifth embodiment, the change of the item indicated by the indicator according to the second embodiment is not described. However, the change of the item indicated by the indicator can be adopted in the fifth embodiment in the same manner as in the second embodiment. Also, the ten-key is used as the group and item indicating unit 44. However, it is applicable that a remote control unit, an eye detecting unit or a mouse be used as the group and item indicating unit 44.

(Sixth Embodiment)

Figure 38:
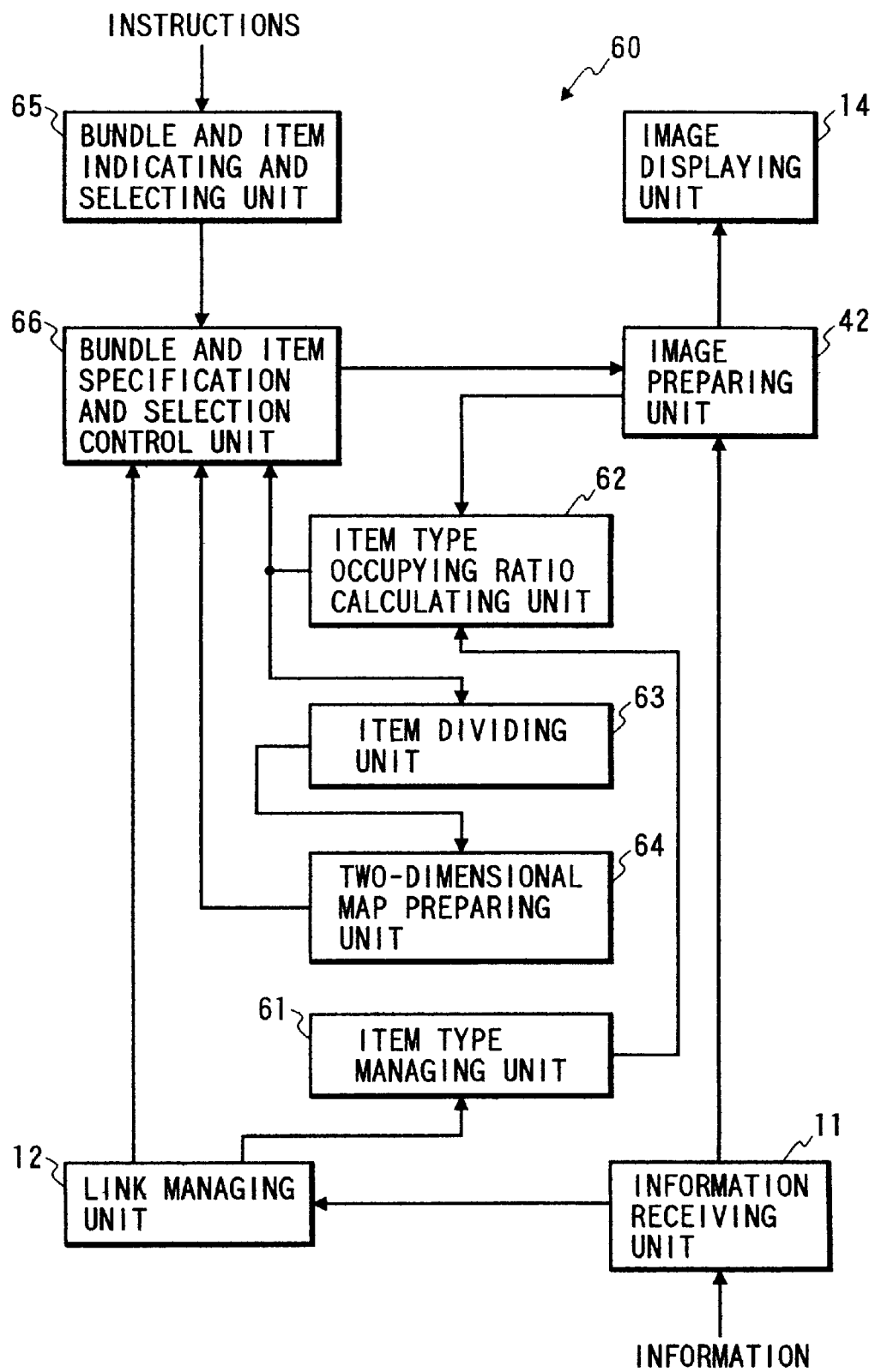
FIG. 38 is a block diagram of an item selecting apparatus according to a sixth embodiment of the present invention.

FIG. 38 is a block diagram of an item selecting apparatus according to a sixth embodiment of the present invention.

As shown in FIG. 38, an item selecting apparatus 60 comprises the information receiving unit 11, the link managing unit 12 for detecting a large number of pieces of link information respectively indicating a link relationship between the particular page and a reference page from the information received in the information receiving unit 11 and managing the reception of pieces of reference information of the reference page performed in the information receiving unit 11, the image preparing unit 42 for determining a display layout of the pieces of information received in the information receiving unit 11 and preparing an image of the pieces of information arranged according to the display layout on condition that the pieces of link information detected by the link managing unit 12 are placed at one or more selection possible positions in the image as one or more items, the image displaying unit 14, an item type managing unit 61 for detecting types (text, image, dynamic image and the like) of items and allocating one or more items having the same type to one type-group for each of the types to allocate all items to a plurality of type-groups respectively corresponding to one type, an item type occupying ratio calculating unit 62 for calculating a total item area of one or more items, which are displayed on the image displaying unit 14 and are allocated to the same type-group by the item type managing unit 61, for each of the type groups and calculating a ratio (%) of the total item area occupying in the image to an area of the image for each of the type-groups, an item dividing unit 63 for dividing the items displayed on the image displaying unit 14 into a plurality of bundles respectively placed at a selection possible region according to the ratio for each of the types calculated in the item type occupying ratio calculating unit 62, a two-dimensional map preparing unit 64 for preparing a two-dimensional bundle map indicating a positional relationship between each pair of bundles obtained in the item dividing unit 63 and preparing a two-dimensional map indicating a positional relationship between each pair of items for each bundle, a bundle and item indicating and selecting unit 65 for receiving a bundle changing instruction indicating a change of a remarked bundle displayed on the image displaying unit 14 to another bundle placed on one (right, left, upper or lower) side of the remarked bundle from a user to indicate a particular bundle placed at a particular selection possible region by repeating the change of the remarked bundle, receiving a bundle selecting instruction indicating the selection of the particular bundle in cases where it is judged by the user that a particular item existing in the particular bundle agrees with a desired item, receiving an item changing instruction indicating a change of a remarked item displayed on the image displaying unit 14 to another item placed on one (right, left, upper or lower) side of the remarked item from the user to indicate the particular item placed at a particular selection possible position by repeating the change of the remarked item and receiving an item selecting instruction indicating the selection of the particular item;

a bundle and item specification and selection control unit 66 for analyzing the bundle changing instruction received in the bundle and item indicating and selecting unit 65 while referring to the two-dimensional bundle map prepared by the two-dimensional map preparing unit 64 to specify one bundle placed on one side of the remarked bundle as a new remarked bundle, specifying the particular bundle by analyzing the bundle changing instructions repeatedly received in the bundle and item indicating and selecting unit 65, selecting the particular bundle according to the bundle selecting instruction received in the bundle and item indicating and selecting unit 65, analyzing the item changing instruction received in the bundle and item indicating and selecting unit 65 while referring to the two-dimensional map prepared by the two-dimensional map preparing unit 64 to specify one item placed on one side of the remarked item as a new remarked item, specifying the particular bundle by analyzing the item changing instructions repeatedly received in the bundle and item indicating and selecting unit 65, selecting the particular item according to the item selecting instruction received in the bundle and item indicating and selecting unit 65 and instructing the information receiving unit 11 to receive pieces of information relating to one reference page indicated by the particular item.

In the above configuration, an operation of the item selecting apparatus 60 is described with reference to FIG. 39.

Figure 39:
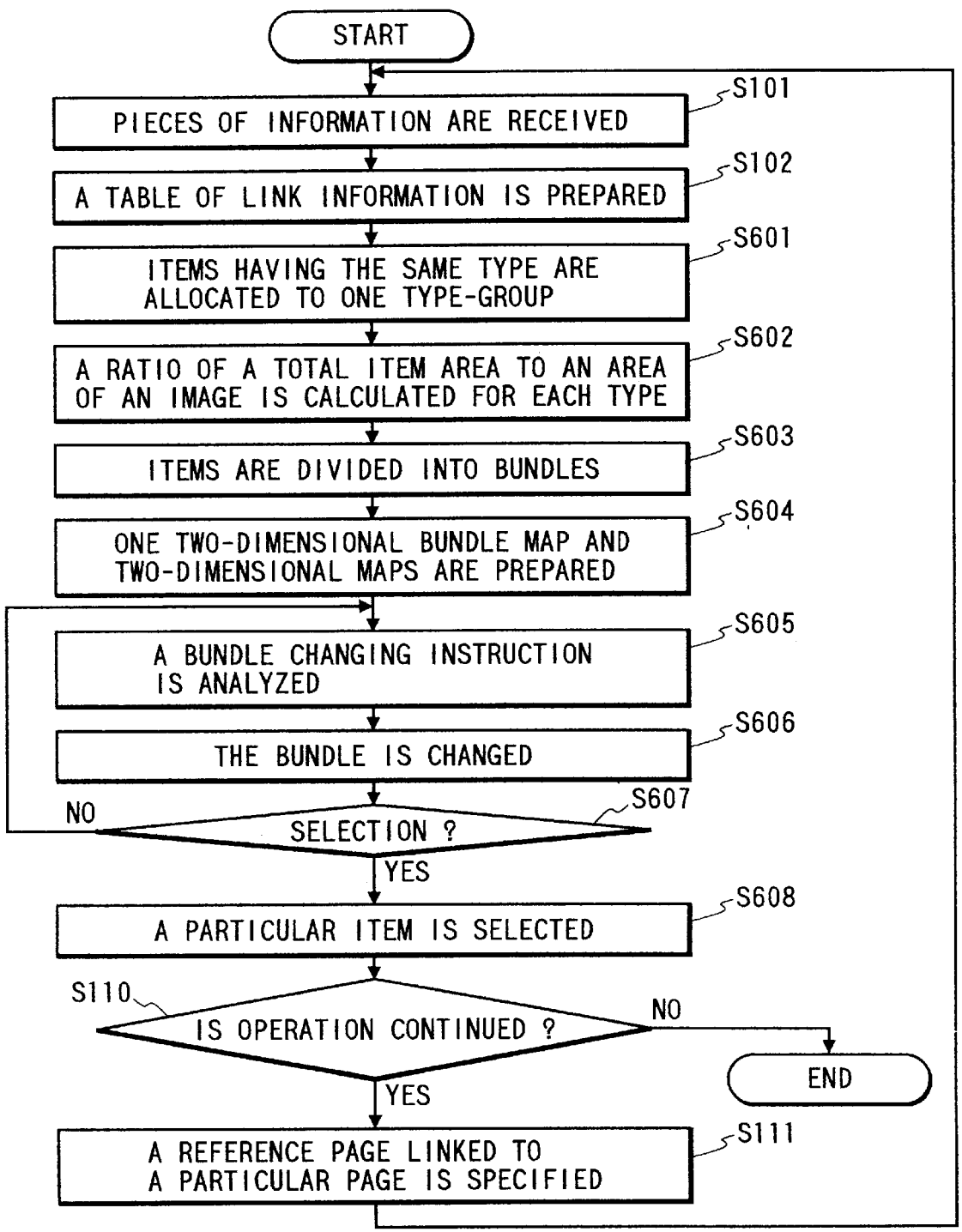
FIG. 39 shows a flow chart of an operation performed in the item selecting apparatus shown in FIG. 38.
Figures 42, 43:
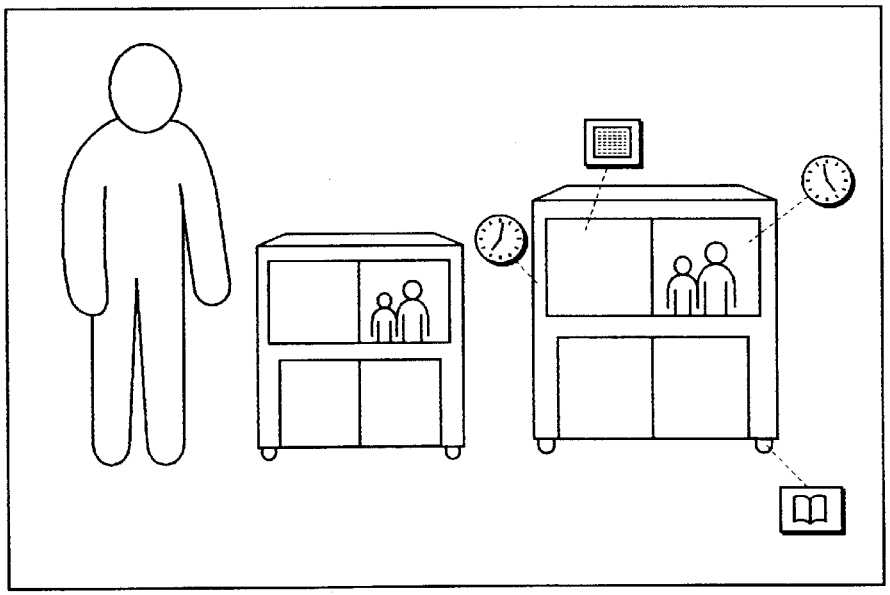
FIG. 42 shows a plurality of text type items existing in the document shown in FIG. 41.
FIG. 43 shows an advertisement of which pieces of information are received and displayed in the item selecting apparatus shown in FIG. 38.
Figures 44, 45, 46:
FIG. 44 shows a plurality of text type items and image type items existing in the document shown in FIG. 41.
FIG. 45 shows a ratio of a total item area of text type items to an area of an image displayed on an image displaying unit and the number of text type items.
FIG. 46 shows a ratio of a total item area of text type items, the number of text type items, a ratio of a total item area of image type items and the number of image type items.

As shown in FIG. 39, when pieces of information of a particular page is received in the information receiving unit 11 (step S101), and a table of the pieces of link information is prepared in the link managing unit 12 (step S102). Thereafter, a type (a text type, an image type or the like) of each of the items are detected, and one or more items having the same type are allocated to one type-group for each of the type-groups in the item type managing unit 61 (step S601). In the structural document form according to the HTML, the items are, for example, classified into a text type, an image type, a dynamic image type and the like, and each of the items displayed on the image displaying unit 14 is allocated to one of a plurality of type-groups respectively corresponding to one type. As shown in FIG. 40, in cases where many alphabets and numerals are included in an item, the item is classified as a text type. Also, in cases where contents of an item matches with a GIF type image or a JPEG type image, the item is classified as an image type. For example, in cases where the information of the particular page received in the information receiving unit 11 is a document shown in FIG. 41, as shown in FIG. 42, there are many text type items, and any image type item does not exist in the document. Also, in cases where the information of the particular page received in the information receiving unit 11 is an advertisement shown in FIG. 43, as shown in FIG. 44, many text type items and image type items exist in the advertisement.

Thereafter, a total item area of a plurality of items which are displayed on the image displaying unit 14 and have the same type and the number of items are calculated for each of the types, and a ratio (%) of the total item area occupying in the image to an area of the image is calculated for each of the types in the item type occupying ratio calculating unit 62 (step S602). For example, in cases where the information of the document shown in FIG. 41 are received, as shown in FIG. 45, a ratio (%) of the total item area of the text type items to an area of the image is 60%. Also, in cases where the advertisement shown in FIG. 43 are received, as shown in FIG. 46, a ratio (%) of the total item area of the text type items to an area of the image is only 2%, and a ratio (%) of the total item area of the image type items to the area of the image is 90%.

Figure 47:
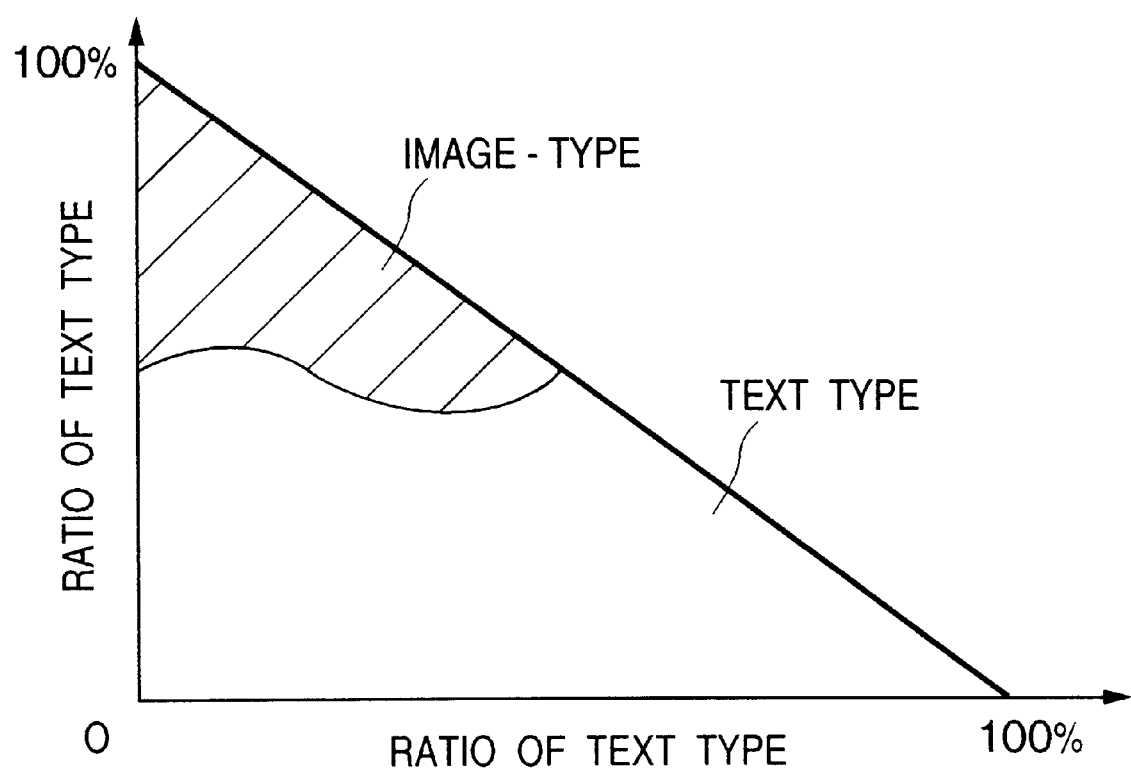
FIG. 47 shows a relationship between a ratio of text type items and a ratio of image type items.

Thereafter, the items displayed on the image displaying unit 14 are divided into a plurality of bundles respectively placed at a selection possible region according to the ratios in the item dividing unit 63 (step S603). That is, as shown in FIG. 47, a relationship between a ratio of text type items and a ratio of image type items is stored in the item dividing unit 63 in advance, and it is judged according to the ratios whether an image displayed on the image displaying unit 14 is a text type or an image type. In cases where the ratio (%) of the total item area of the text type items is sufficiently high, it is judged that the image displayed on the image displaying unit 14 is a text type. In this case, the items displayed on the image displaying unit 14 are divided for each paragraph. That is, each paragraph corresponds to one bundle. For example, in cases where the information of the document shown in FIG. 41 are received, because the ratio (%) of the total item area of the text type items is sufficiently high, the items displayed on the image displaying unit 14 are divided for each paragraph. In contrast, in cases where the ratio (%) of the total item area of the image type items is sufficiently high, it is judged that the image displayed on the image displaying unit 14 is an image type. In this case, the items displayed on the image displaying unit 14 are divided for each image type item in cases where the number of image type items is not large. That is, each image item corresponds to one bundle. Also, in cases where the number of image type items is large, it is judged that the image is composed of a plurality of menus and icons, so that a type-group of image type items gathered in a narrow region corresponds to one bundle. For example, in cases where the information of the advertisement shown in FIG. 43 are received, because the ratio (%) of the total item area of the image type items is sufficiently high, the items displayed on the image displaying unit 14 are divided for each image type item.

Thereafter, one two-dimensional bundle map indicating a positional relationship between each pair of bundles is prepared in the two-dimensional map preparing unit 64, and one two-dimensional map indicating a positional relationship between each pair of items is prepared for each bundle in the two-dimensional map preparing unit 64 (step S604).

Thereafter, each time a bundle changing instruction indicating a change of the bundle indicated by an indicator is input to the bundle and item indicating and selecting unit 65, the bundle changing instruction is analyzed by the bundle and item specification and selection control unit 66 according to the two-dimensional bundle map (step S605), and the bundle indicated by the indicator is changed (step S606). After a particular bundle in which a particular item desired to be selected is included is selected (step S607), the particular item is selected in the same manner as in the first embodiment (step S608), and the procedure proceeds to the step S110.

Accordingly, because the items are classified into various types and the items are divided into a plurality of bundles according to the types of items, even though the number of items in one page is large, a desired item can be easily selected at a short time by selecting a particular bundle relating to the desired item.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. An item selecting apparatus, comprising:

information receiving means for receiving pieces of information relating to a particular page;

link managing means for extracting pieces of link information respectively indicating a link relationship between the particular page and a reference page from the pieces of information received by the information receiving means, treating the pieces of link information as a plurality of items and managing a positional relationship among the items in the particular page;

two-dimensional map preparing means for preparing a two-dimensional map indicating a relative positional relationship between each pair of items according to the positional relationship among the items managed by the link managing means;

image preparing means for determining a display layout of the pieces of information received by the information receiving means while maintaining the positional relation among the items managed by the link managing means and preparing an image of the pieces of information, in which the items are included, according to the display layout;

image displaying means for displaying the image of the pieces of information prepared by the image preparing means;

instruction receiving means for receiving an upper instruction indicating a change of a remarked item of the image displayed by the image displaying means to an item placed on the upper side of the remarked item, a lower instruction indicating a change of the remarked item to an item placed on the lower side of the remarked item, a right instruction indicating a change of the remarked item to an item placed on the right side of the remarked item or a left instruction indicating a change of the remarked item to an item placed on the left side of the remarked item and receiving a selection instruction; and item specifying and selecting means for specifying a particular item placed on the upper side of the remarked item in the two-dimensional map prepared by the two-dimensional map preparing means in cases where the upper instruction is received by the instruction receiving means, specifying a particular item placed on the lower side of the remarked item in the two-dimensional map prepared by the two-dimensional map preparing means in cases where the lower instruction is received by the instruction receiving means, specifying a particular item placed on the right side of the remarked item in the two-dimensional map prepared by the two-dimensional map preparing means in cases where the right instruction is received by the instruction receiving means, specifying a particular item placed on the left side of the remarked item in the two-dimensional map prepared by the two-dimensional map preparing means in cases where the left instruction is received by the instruction receiving means, and selecting the particular item in cases where the selection instruction is received by the instruction receiving means.

2. An item selecting apparatus according to claim 1 in which the items are displayed by the image displaying means on condition that it is explicitly indicated that each of the items is possible to be selected.

3. An item selecting apparatus, comprising:

information receiving means for receiving pieces of information relating to a particular page;

link managing means for extracting pieces of link information respectively indicating a link relationship between the particular page and a reference page from the pieces of information received by the information receiving means, treating the pieces of link information as a plurality of items and managing a positional relationship among the items in the particular page;

image displaying means for displaying an image of partial pieces of information, which are selected from the pieces of information received by the information receiving means, each time the image is changed by changing the partial pieces of information;

image preparing means for determining a display layout of the pieces of information received by the information receiving means while maintaining the positional relationship among the items managed by the link managing means and preparing the image of the partial pieces of information displayed by the image displaying means according to the display layout for the partial pieces of information each time the image is changed;

two-dimensional map preparing means for preparing a two-dimensional map indicating a relative positional relationship between each pair of items included in the partial pieces of information, of which the image is displayed by the image displaying means, according to the positional relationship among the items managed by the link managing means each time the image is changed;

instruction receiving means for receiving an upper instruction indicating a change of a remarked item of the image displayed by the image displaying means to an item placed on the upper side of the remarked item, a lower instruction indicating a change of the remarked item to an item placed on the lower side of the remarked item, a right instruction indicating a change of the remarked item to an item placed on the right side of the remarked item or a left instruction indicating a change of the remarked item to an item placed on the left side of the remarked item and receiving a selection instruction; and item specifying and selecting means for specifying a particular item placed on the upper side of the remarked item in the two-dimensional map prepared by the two-dimensional map preparing means in cases where the upper instruction is received by the instruction receiving means, specifying a particular item placed on the lower side of the remarked item in the two-dimensional map prepared by the two-dimensional map preparing means in cases where the lower instruction is received by the instruction receiving means, specifying a particular item placed on the right side of the remarked item in the two-dimensional map prepared by the two-dimensional map preparing means in cases where the right instruction is received by the instruction receiving means, specifying a particular item placed on the left side of the remarked item in the two-dimensional map prepared by the two-dimensional map preparing means in cases where the left instruction is received by the instruction receiving means, and selecting the particular item in cases where the selection instruction is received by the instruction receiving means.

4. An item selecting apparatus according to claim 3 in which the items denoting the pieces of link information extracted by the link managing means are arranged in a changeable region of the image displayed by the image displaying means, one or more fixed items are added in the image prepared by the image preparing means and are arranged in a fixed region of the image displayed by the image displaying means, one two-dimensional map indicating a relative positional relationship between each pair of items, which are selected from the items of the changeable region and the fixed items of the fixed region, is prepared by the two-dimensional map preparing means, the items arranged in the changeable region of the image are changed each time the image is changed, the fixed items arranged in the fixed region of the image are not changed even though the image is changed, and the particular item determined among the items of the changeable region and the fixed items of the fixed region is selected by the item specifying and selecting means.

5. An item selecting apparatus according to claim 4 in which the image displayed by the displaying means is changed each time a scroll operation is performed.

6. An item selecting apparatus according to claim 3, further comprising:

original position managing means for specifying a first coordinate value of an original item in a lateral direction and a second coordinate value of the original item in a longitudinal direction, holding the first coordinate value of the original item in cases where the particular item placed on the upper or lower side of the original item and one or more remarked items placed between the original item and the particular item are indicated one after another by an indicator according to the upper and/or lower instructions received by the instruction receiving means and holding the second coordinate value of the original item in cases where the particular item placed on the right or left side of the original item and one or more remarked items placed between the original item and the particular item are indicated one after another by an indicator according to the right and/or left instructions received by the instruction receiving means, and one item of which a coordinate value in the lateral direction is closest to the first coordinate value of the original item held by the original position managing means among those of a plurality of items placed on the upper or lower side of the original item is specified as one remarked item or the particular item by the item specifying and selecting means in cases where one upper or lower instruction is received by the instruction receiving means, and one item of which a coordinate value in the longitudinal direction is closest to the second coordinate value of the original item held by the original position managing means among those of a plurality of items placed on the right or left side of the original item is specified as one remarked item or the particular item by the item specifying and selecting means in cases where one right or left instruction is received by the instruction receiving means.

7. An item selecting apparatus comprising:

information receiving means for receiving pieces of information relating to a particular page;

link managing means for extracting pieces of link information respectively indicating a link relationship between the particular page and a reference page from the pieces of information received by the information receiving means, treating the pieces of link information as a plurality of changeable items and managing a positional relationship among the changeable items in the particular page;

image preparing means for determining a display layout of the pieces of information received by the information receiving means while maintaining the positional relationship among the changeable items managed by the link managing means and preparing a combined image composed of a fixed image of one or more fixed items and a changeable image of partial pieces of information, which are selected from the pieces of information received by the information receiving means, each time the changeable image is changed by changing the partial pieces of information;

image displaying means for displaying the combined image prepared by the image preparing means according to the display layout for the partial pieces of information each time the changeable image is changed on condition that the changeable image is placed at a changeable region of the combined image and the fixed image is placed at a fixed region of the combined image;

two-dimensional map preparing means for preparing a prototype two-dimensional map indicating a relative positional relationship between each pair of changeable items according to the positional relationship among the changeable items managed by the link managing means, preparing a changeable two-dimensional map indicating a relative positional relationship between each fixed item and one changeable item adjacent to the corresponding changeable item and revising the changeable two-dimensional map each time the changeable image is changed;

instruction receiving means for receiving an upper instruction indicating a change of a remarked item of the image displayed by the image displaying means to an item placed on the upper side of the remarked item, a lower instruction indicating a change of the remarked item to an item placed on the lower side of the remarked item, a right instruction indicating a change of the remarked item to an item placed on the right side of the remarked item or a left instruction indicating a change of the remarked item to an item placed on the left side of the remarked item and receiving a selection instruction; and item specifying and selecting means for specifying a particular item placed on the upper side of the remarked item in the prototype two-dimensional map and the changeable two-dimensional map prepared by the two-dimensional map preparing means in cases where the upper instruction is received by the instruction receiving means and the particular item corresponds to one fixed item, specifying a particular item placed on the lower side of the remarked item in the prototype two-dimensional map and the changeable two-dimensional map prepared by the two-dimensional map preparing means in cases where the lower instruction is received by the instruction receiving means and the particular item corresponds to one fixed item, specifying a particular item placed on the right side of the remarked item in the prototype two-dimensional map and the changeable two-dimensional map prepared by the two-dimensional map preparing means in cases where the right instruction is received by the instruction receiving means and the particular item corresponds to one fixed item, specifying a particular item placed on the left side of the remarked item in the prototype two-dimensional map and the changeable two-dimensional map prepared by the two-dimensional map preparing means in cases where the left instruction is received by the instruction receiving means and the particular item corresponds to one fixed item, and selecting the particular item in cases where the selection instruction is received by the instruction receiving means.

8. An item selecting apparatus according to claim 7 further comprising:

emerging item detecting means for detecting one or more new changeable items newly emerging in the changeable image of the combined image prepared by the image preparing means each time the changeable image is changed, the changeable two-dimensional map being revised by the two-dimensional map preparing means in cases where one of the new changeable items is adjacent to one fixed item.

9. An item selecting apparatus, comprising:

information receiving means for receiving pieces of information relating to a particular page;

link managing means for extracting pieces of link information respectively indicating a link relationship between the particular page and a reference page from the pieces of information received by the information receiving means, treating the pieces of link information as a plurality of items and managing a positional relationship among the items in the particular page;

item classifying means for classifying the items into a plurality of item groups hierarchically ranked to various levels in a tree structure on condition that the items are allocated to a plurality of items groups ranked to the same level for each level;

image preparing means for determining a display layout of the pieces of information received by the information receiving means while maintaining the positional relationship among the items managed by the link managing means and preparing an image of the pieces of information, in which the items are included, according to the display layout on condition that the image is composed of a plurality of sub-images arranged in the tree structure and respectively corresponding to one item group prepared by the item classifying means;

displaying means for displaying the image of the pieces of information prepared by the image preparing means;

two-dimensional map preparing means for preparing a two-dimensional group map indicating a relative positional relationship between each pair of item groups existing in the same level for each level of the item groups prepared by the item classifying means, preparing a two-dimensional map indicating a relative positional relationship between each pair of items allocated to one item group for each of the item groups ranked to the lowest level;

instruction receiving means for receiving a series of group changing instructions respectively indicating a change of a remarked item group displayed by the image displaying means to an item group placed on particular side of the remarked item group to indicate a plurality of item groups ranked to different levels in the order of levels of the plurality of item groups, receiving a group selecting instruction indicating the selection of one item group finally indicated by one group changing instruction, receiving an item changing upper instruction indicating a change of a remarked item allocated to the item group finally indicated by one group changing instruction to an item placed on the upper side of the remarked item, an item changing lower instruction indicating a change of the remarked item to an item placed on the lower side of the remarked item, an item changing right instruction indicating a change of the remarked item to an item placed on the right side of the remarked item or an item changing left instruction indicating a change of the remarked item to an item placed on the left side of the remarked item and receiving an item selecting instruction; and item specifying and selecting means for specifying a particular item group placed on the particular side of the remarked item group in one corresponding two-dimensional group map prepared by the two-dimensional map preparing means each time one group changing instruction is received by the instruction receiving means, selecting the particular item group finally indicated by the group selecting instruction in cases where the goup selecting instruction is received by the instruction receiving means, specifying a particular item placed on the upper side of the remarked items in one two-dimensional map for the particular item group prepared by the two-dimensional map preparing means in cases where the item changing upper instruction is received by the instruction receiving means, specifying a particular item placed on the lower side of the remarked item in one two-dimensional map for the particular item group in cases where the item changing lower instruction is received by the instruction receiving means, specifying a particular item placed on the right side of the remarked item in one two-dimensional map for the particular item group in cases where the item changing right instruction is received by the instruction receiving means, specifying a particular item placed on the left side of the remarked item in one two-dimensional map for the particular item group in cases where the item changing left instruction is received by the instruction receiving means, and selecting the particular item in cases where the item selecting instruction is received by the instruction receiving means.

10. An item selecting apparatus according to claim 9 in which a combined two-dimensional group map obtained by merging one combined two-dimensional group map previously prepared for a first particular item group with one two-dimensional group map for a second particular item group selected by the item specifying and selecting means just after the selection of the first particular item group is prepared by the two-dimensional map preparing means, and a third particular item group existing in the second particular item group is specified and selected according to the combined two-dimensional group map by the item specifying and selecting means.

11. An item selecting apparatus according to claim 1, further comprising:

item type managing means for detecting types of the items extracted by the link managing means, allocating one or more items having the same type to one type-group for each of the types to allocate all of the items to a plurality of type-groups respectively corresponding to one type and managing the items having the type-groups;

item type occupying ratio calculating means for calculating a total item area occupied by one or more items, which are displayed by the image displaying means and are allocated to the same type-group by the item type managing means, for each of the type-groups and calculating a ratio of the total item area to an area of the image for each of the type groups; and item dividing means for dividing the items displayed by the image displaying means into a plurality of bundles respectively placed at a selection possible region according to a dividing method determined by the ratios calculated by the item type occupying ratio calculating means for the type-groups, wherein a two-dimensional bundle map indicating a positional relationship between each pair of bundles obtained by the item dividing means is additionally prepared by the two-dimensional map preparing means, the two-dimensional map is prepared by the two-dimensional map preparing means for each bundle, a series of bundle changing instructions respectively indicating a change of a remarked bundle displayed by the image displaying means to another bundle placed on a particular bundle side of the remarked bundle is received by the instruction receiving means to indicate a particular bundle placed at a particular selection possible region, a bundle selecting instruction indicating the selection of the particular bundle is received by the instruction receiving means in cases where one bundle remarked according to one bundle changing instruction finally received agrees with the particular bundle, the particular bundle is selected by the item specifying and selecting means according to the bundle selecting instruction, a series of item changing instructions respectively indicating a change of a remarked item in the particular bundle displayed by the image displaying means to another item placed on the particular side of the remarked item is received by the instruction receiving means to indicate the particular item placed at a particular selection possible position, an item selecting instruction indicating the selection of the particular item is received by the instruction receiving means in cases where one item remarked according to one item changing instruction finally received agrees with the particular item, and the particular item is selected by the item specifying and selecting means according to the item selecting instruction.

12. An item selecting apparatus according to claim 11 in which the types of the items managed by the item type managing means are a text type and an image type.

* * * * *